US011740664B2

(12) United States Patent
Yao et al.

(10) Patent No.: US 11,740,664 B2
(45) Date of Patent: *Aug. 29, 2023

(54) AUXILIARY MONITORS WITH ARTICULATED HINGE

(71) Applicant: MOBILE PIXELS INC., Irwindale, CA (US)

(72) Inventors: Xiaoliang Yao, Burlington, MA (US); Wenglong Ng, Burlington, MA (US); Brian Hyunsuk Yoo, Arlington, MA (US); Andrew Jones, Roslindale, MA (US); Elizabeth Goodrich, Roslindale, MA (US)

(73) Assignee: MOBILE PIXELS INC., Irwindale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,257

(22) Filed: Jan. 19, 2022

(65) Prior Publication Data

US 2022/0397941 A1    Dec. 15, 2022

Related U.S. Application Data

(60) Provisional application No. 63/300,342, filed on Jan. 18, 2022, provisional application No. 63/209,039, filed on Jun. 10, 2021.

(51) Int. Cl.
G06F 1/16    (2006.01)

(52) U.S. Cl.
CPC ............ *G06F 1/166* (2013.01); *G06F 1/1601* (2013.01); *G06F 1/1616* (2013.01); *G06F 1/1624* (2013.01); *G06F 1/1647* (2013.01); *G06F 1/1652* (2013.01); *G06F 1/1681* (2013.01); *G06F 1/1607* (2013.01)

(58) Field of Classification Search
CPC .... G06F 1/1601; G06F 1/1607; G06F 1/1616; G06F 1/1624; G06F 1/1632; G06F 1/1647; G06F 1/1681
USPC ......................... 248/917; 361/679.04, 679.22
See application file for complete search history.

(56) References Cited

U.S. PATENT DOCUMENTS

| | | | |
|---|---|---|---|
| D247,194 S | 2/1978 | Win | |
| 4,569,613 A | 2/1986 | Thomas | |
| 4,602,855 A * | 7/1986 | Frey | A47G 1/24 248/476 |
| D290,404 S | 6/1987 | Staler | |
| 4,867,479 A | 9/1989 | Mizutani | |
| 5,067,834 A * | 11/1991 | Szmanda | F16M 11/28 400/489 |
| 5,471,808 A | 12/1995 | De Pieri et al. | |
| 5,537,127 A * | 7/1996 | Jingu | F16M 11/24 361/679.04 |
| D374,650 S | 10/1996 | Shermeto | |
| 5,590,021 A * | 12/1996 | Register | G06F 1/1601 361/679.21 |

(Continued)

*Primary Examiner* — Adrian S Wilson

(57) ABSTRACT

According to aspects of the disclosure, a display system is provided comprising a support, a first display coupled to the support, wherein the first display is configured to display output information received from at least one computing device, and a second display rotatably coupled to the first display and rotatably coupled to the support, wherein the second display is configured to display output information received from the at least one computing device.

13 Claims, 23 Drawing Sheets

(56) References Cited

U.S. PATENT DOCUMENTS

| | | | |
|---|---|---|---|
| 5,614,838 A | 3/1997 | Jaber et al. | |
| 5,687,939 A * | 11/1997 | Moscovitch | F16M 11/24 361/679.04 |
| 5,768,163 A * | 6/1998 | Smith, II | G06F 1/1601 361/679.28 |
| 5,777,704 A * | 7/1998 | Selker | G06F 1/1616 349/1 |
| 5,847,698 A * | 12/1998 | Reavey | G06F 15/0283 361/679.04 |
| 6,061,104 A * | 5/2000 | Evanicky | F16M 11/10 248/921 |
| 6,094,341 A * | 7/2000 | Lin | G06F 1/1679 361/679.04 |
| 6,134,103 A * | 10/2000 | Ghanma | G06F 1/1681 248/920 |
| 6,189,849 B1 * | 2/2001 | Sweere | F16M 11/30 248/295.11 |
| D448,023 S * | 9/2001 | Kim | D14/337 |
| 6,295,038 B1 * | 9/2001 | Rebeske | G06F 1/1616 361/679.04 |
| 6,343,006 B1 * | 1/2002 | Moscovitch | B60R 11/0235 361/679.04 |
| D456,796 S | 5/2002 | Silver | |
| 6,449,143 B2 * | 9/2002 | Rooyakkers | A47B 83/001 361/679.04 |
| 6,532,146 B1 | 3/2003 | Duquette | |
| 6,667,877 B2 | 12/2003 | Duquette | |
| 6,667,878 B2 * | 12/2003 | Ponx | G06F 1/1649 361/679.04 |
| 6,844,865 B2 * | 1/2005 | Stasko | F16M 11/22 361/679.04 |
| 6,873,521 B2 * | 3/2005 | Landry | G06F 3/0338 348/794 |
| 6,909,597 B2 * | 6/2005 | Tutikawa | G06F 1/1656 345/169 |
| D507,270 S * | 7/2005 | Ozolins | D14/375 |
| 6,967,632 B1 * | 11/2005 | Minami | F16M 11/10 403/80 |
| 7,091,961 B2 * | 8/2006 | Ditzik | G06F 1/16 345/905 |
| D534,588 S | 1/2007 | Nuttall | |
| 7,239,505 B2 * | 7/2007 | Keely | G06F 1/1681 361/679.09 |
| 7,283,353 B1 | 10/2007 | Jordan et al. | |
| 7,327,560 B1 * | 2/2008 | Tabasso | G06F 1/3231 361/679.09 |
| 7,630,193 B2 * | 12/2009 | Ledbetter | F16M 11/2021 361/679.21 |
| 7,660,914 B2 | 2/2010 | Perez et al. | |
| D615,082 S | 5/2010 | Taichi | |
| 7,717,384 B2 * | 5/2010 | Kim | F16M 11/10 248/920 |
| 7,800,892 B2 * | 9/2010 | Gaskill | F16M 11/10 361/679.04 |
| 7,813,118 B2 * | 10/2010 | Burge | H04R 1/026 361/825 |
| 7,845,608 B1 * | 12/2010 | Chen | G06F 1/1607 248/921 |
| 7,848,091 B2 | 12/2010 | Han et al. | |
| 7,848,786 B2 * | 12/2010 | Liu | H04M 1/0247 455/575.4 |
| D630,628 S | 1/2011 | Kovac | |
| 7,887,014 B2 * | 2/2011 | Lindblad | F16M 13/00 248/918 |
| 7,889,481 B2 * | 2/2011 | Mickey | F16M 11/126 361/679.04 |
| D634,745 S | 3/2011 | Park et al. | |
| 7,911,784 B2 * | 3/2011 | Jones | G06F 1/1632 361/679.55 |
| 7,986,517 B2 | 7/2011 | Jiang et al. | |
| 7,990,338 B2 | 8/2011 | Teng et al. | |
| 8,018,715 B2 | 9/2011 | Chang | |
| 8,083,189 B2 * | 12/2011 | Sun | G06F 1/1607 361/679.04 |
| D652,832 S | 1/2012 | Wu et al. | |
| D665,123 S | 8/2012 | Douglas | |
| 8,235,335 B2 * | 8/2012 | Sato | G02F 1/13336 248/922 |
| 8,254,100 B2 * | 8/2012 | Lou | G11B 33/10 248/176.1 |
| 8,314,751 B2 | 11/2012 | Yang | |
| 8,317,146 B2 * | 11/2012 | Jung | G06F 1/1601 361/679.04 |
| D674,220 S | 1/2013 | Kim | |
| 8,342,462 B2 * | 1/2013 | Sapper | F16M 11/2057 248/920 |
| 8,462,103 B1 * | 6/2013 | Moscovitch | F16M 13/02 345/55 |
| 8,472,174 B2 * | 6/2013 | Idems | H05K 7/20972 361/679.21 |
| 8,488,306 B2 * | 7/2013 | Mickey | F16M 13/022 361/679.04 |
| 8,498,101 B2 * | 7/2013 | Chiang | F16M 11/105 361/679.22 |
| 8,529,111 B2 | 9/2013 | Chang | |
| 8,570,723 B2 * | 10/2013 | Myerchin | F16L 3/16 361/679.05 |
| 8,608,119 B2 * | 12/2013 | Wolff | F16M 11/2021 248/292.11 |
| 8,797,728 B2 * | 8/2014 | Han | F16M 11/06 361/679.21 |
| D715,301 S | 10/2014 | Ashcraft et al. | |
| D727,895 S | 4/2015 | Aoki et al. | |
| 9,016,647 B2 * | 4/2015 | Lu | F16M 13/00 248/221.11 |
| 9,089,216 B2 * | 7/2015 | Liu | F16M 11/22 |
| 9,207,722 B2 * | 12/2015 | Ergun | G06F 1/1632 |
| 9,253,294 B2 * | 2/2016 | Mitchell | G06F 1/1641 |
| D761,800 S | 7/2016 | Muller | |
| 9,529,464 B2 * | 12/2016 | Sitbon | G06F 3/041 |
| D779,713 S | 2/2017 | Sonneman | |
| 9,660,466 B2 * | 5/2017 | Ergun | G06F 1/189 |
| D791,400 S | 7/2017 | Sonneman | |
| D808,950 S | 1/2018 | Miele et al. | |
| 9,951,903 B2 * | 4/2018 | Barnes | F16M 11/10 |
| 10,114,409 B2 * | 10/2018 | Michino | G06F 1/1637 |
| 10,208,891 B2 * | 2/2019 | Myerchin | F16M 11/38 |
| 10,451,213 B2 * | 10/2019 | Liang | F16M 11/046 |
| 10,550,995 B1 | 2/2020 | Hung et al. | |
| D880,474 S * | 4/2020 | Finckh | D14/336 |
| D883,990 S | 5/2020 | Yao et al. | |
| 10,871,801 B2 | 12/2020 | Yao et al. | |
| 10,936,020 B2 * | 3/2021 | Chang | G06F 1/1692 |
| D920,975 S | 6/2021 | Yao et al. | |
| 11,039,542 B2 * | 6/2021 | Yu | G06F 1/1616 |
| 11,054,122 B2 * | 7/2021 | Chang | F21V 21/26 |
| 11,226,660 B2 * | 1/2022 | Oakley | G06F 1/1637 |
| 11,243,565 B2 * | 2/2022 | Shi | G06F 1/165 |
| 11,297,940 B2 * | 4/2022 | Horn | A47B 97/00 |
| 11,378,226 B2 * | 7/2022 | Roarty | F16M 11/08 |
| 11,507,142 B1 * | 11/2022 | Davis | F16M 13/005 |
| 2003/0095373 A1 | 5/2003 | Duquette | |
| 2003/0142474 A1 * | 7/2003 | Karidis | G06F 1/1681 361/679.06 |
| 2005/0146845 A1 * | 7/2005 | Moscovitch | B60R 11/0235 361/679.27 |
| 2005/0162821 A1 | 7/2005 | Homer et al. | |
| 2005/0243021 A1 | 11/2005 | Perez et al. | |
| 2006/0082518 A1 | 4/2006 | Ram | |
| 2006/0108483 A1 * | 5/2006 | Wolff | G06F 1/1632 248/122.1 |
| 2006/0126284 A1 * | 6/2006 | Moscovitch | G06F 1/1649 361/679.04 |
| 2006/0268500 A1 | 11/2006 | Kuhn | |
| 2007/0080950 A1 | 4/2007 | Lee et al. | |
| 2007/0084978 A1 * | 4/2007 | Martin | F16M 11/2064 248/176.1 |
| 2008/0002344 A1 * | 1/2008 | Gaskill | G06F 1/1601 361/679.27 |

(56) References Cited

U.S. PATENT DOCUMENTS

| | | | |
|---|---|---|---|
| 2008/0062625 A1* | 3/2008 | Batio | G06F 1/1647 361/679.55 |
| 2008/0117578 A1* | 5/2008 | Moscovitch | F16M 11/2085 361/679.04 |
| 2008/0225472 A1* | 9/2008 | Chih | F16M 11/24 361/679.04 |
| 2008/0247128 A1* | 10/2008 | Khoo | G06F 1/1641 361/679.04 |
| 2008/0252555 A1 | 10/2008 | Jeon | |
| 2008/0316689 A1* | 12/2008 | Moscovitch | G06F 1/1616 361/679.09 |
| 2009/0057514 A1* | 3/2009 | Oh | F16M 13/02 248/282.1 |
| 2009/0086424 A1* | 4/2009 | Jette | G06F 1/1616 361/679.55 |
| 2009/0090825 A1* | 4/2009 | Jung | G06F 1/1601 16/221 |
| 2009/0122474 A1* | 5/2009 | Mickey | F16M 11/126 361/679.04 |
| 2009/0134285 A1* | 5/2009 | Huang | F16M 11/2014 248/124.1 |
| 2009/0146911 A1* | 6/2009 | Kang | G06F 1/1601 345/1.3 |
| 2009/0160777 A1* | 6/2009 | Liu | H01H 13/86 345/169 |
| 2009/0270727 A1* | 10/2009 | Zhao | A61B 8/4433 248/305 |
| 2010/0122924 A1* | 5/2010 | Andrews | A45C 9/00 206/320 |
| 2010/0321275 A1* | 12/2010 | Hinckley | G06F 1/1618 345/1.3 |
| 2011/0216483 A1 | 9/2011 | Vesely | |
| 2011/0228463 A1* | 9/2011 | Matagne | G06F 1/1649 361/679.04 |
| 2011/0298690 A1 | 12/2011 | Reilly | |
| 2012/0119040 A1* | 5/2012 | Ergun | A47B 9/18 248/274.1 |
| 2012/0127646 A1 | 5/2012 | Moscovitch | |
| 2012/0187056 A1* | 7/2012 | Hazzard | F16B 12/20 248/231.71 |
| 2012/0250283 A1* | 10/2012 | Travis | H04M 1/0237 312/223.1 |
| 2013/0277271 A1 | 10/2013 | Toulotte | |
| 2013/0279106 A1* | 10/2013 | Ergun | F16M 11/24 361/679.26 |
| 2014/0139987 A1* | 5/2014 | Onda | G06F 1/1616 361/679.02 |
| 2014/0340827 A1* | 11/2014 | Truong | G06F 1/16 248/122.1 |
| 2015/0301339 A1* | 10/2015 | Harris | F16M 11/24 248/441.1 |
| 2015/0336495 A1* | 11/2015 | Maslakow | F16B 2/185 248/291.1 |
| 2016/0154434 A1 | 6/2016 | Lakhani | |
| 2018/0039300 A1 | 2/2018 | Gonzalez, III | |
| 2019/0332146 A1 | 10/2019 | Yao et al. | |
| 2020/0120194 A1* | 4/2020 | Ahmed | H04N 7/142 |
| 2020/0278722 A1 | 9/2020 | Hudgins et al. | |
| 2020/0333843 A1 | 10/2020 | Yao et al. | |
| 2020/0371563 A1* | 11/2020 | Collins | H05K 7/16 |
| 2021/0333839 A1* | 10/2021 | Yao | G06F 1/1681 |
| 2021/0405702 A1 | 12/2021 | Hudgins et al. | |
| 2022/0397942 A1* | 12/2022 | Yao | G06F 1/1647 |

\* cited by examiner

US 11,740,664 B2

AUXILIARY MONITORS WITH ARTICULATED HINGE

CROSS-REFERENCE TO RELATED APPLICATIONS

This application claims priority under 35 U.S.C. § 119(e) to U.S. Provisional Application Ser. No. 63/209,039, titled "AUXILIARY MONITORS WITH ARTICULATED HINGE," filed on Jun. 10, 2021, and to U.S. Provisional Application Ser. No. 63/300,342, titled "AUXILIARY-MONITOR STAND," filed on Jan. 18, 2022, each of which is hereby incorporated by reference in its entirety.

BACKGROUND

At least one example in accordance with the present disclosure relates generally to electronic displays.

SUMMARY

According to at least one aspect of the present disclosure, a display system is provided comprising a support, a first display coupled to the support, wherein the first display is configured to display output information received from at least one computing device, and a second display rotatably coupled to the first display and rotatably coupled to the support, wherein the second display is configured to display output information received from the at least one computing device.

In some examples, the display system includes a linkage bar coupled to the second display. In various examples, the linkage bar is rotatably coupled to the second display. In at least one example, the display system includes a base coupled to the support via a protrusion, wherein the linkage bar is rotatably coupled to the protrusion. In some examples, the first display is slidably coupled to the support. In various examples, the display system includes a sliding coupler coupled to the first display and slidably coupled to the support. In at least one example, the second display is configured to rotate about the first display responsive to the first display being slid along the support. In some examples, the display system includes a base coupled to the support via a protrusion.

In various examples, the support is rotatably coupled to the protrusion. In at least one example, the display system includes a catch mechanism configured to prevent rotation of the support about the base, and a release mechanism configured to release the catch mechanism. In some examples, the sliding coupler is configured to exert a force on the release mechanism to release the catch mechanism, and releasing the catch mechanism enables rotation of the support about the base. In various examples, the support is configured to rotate approximately 90° about the base.

In at least one example, the sliding coupler is configured to slide between a highest position on the support and a lowest position on the support, and an angle between the first display and the second display at the highest position is approximately 180°. In some examples, the angle between the first display and the second display at the lowest position is approximately 90°. In at least one example, subsequent to rotating the support approximately 90° about the base, the angle between the first display and the second display is approximately 0°.

According to at least one aspect of the disclosure, a method of facilitating use of a display system, the method comprising providing a display system including a support, a first display coupled to the support, wherein the first display is configured to display output information received from at least one computing device, and a second display rotatably coupled to the first display and rotatably coupled to the support, wherein the second display is configured to display output information received from the at least one computing device, instructing a user of the display system to couple the display system to the at least one computing device, and instructing the user of the display system to slide the first display along the support.

In some examples, the method includes instructing the user of the display system to rotate the second display about the first display. In at least one example, the display system further includes a base, and the method further comprises instructing the user to rotate the support about the base. In various examples, instructing the user to rotate the support about the base includes instructing the user to slide the first display to a lowest position on the support. In some examples, instructing the user to rotate the support about the base includes instructing the user to rotate the support approximately 90° to a closed orientation.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1A:
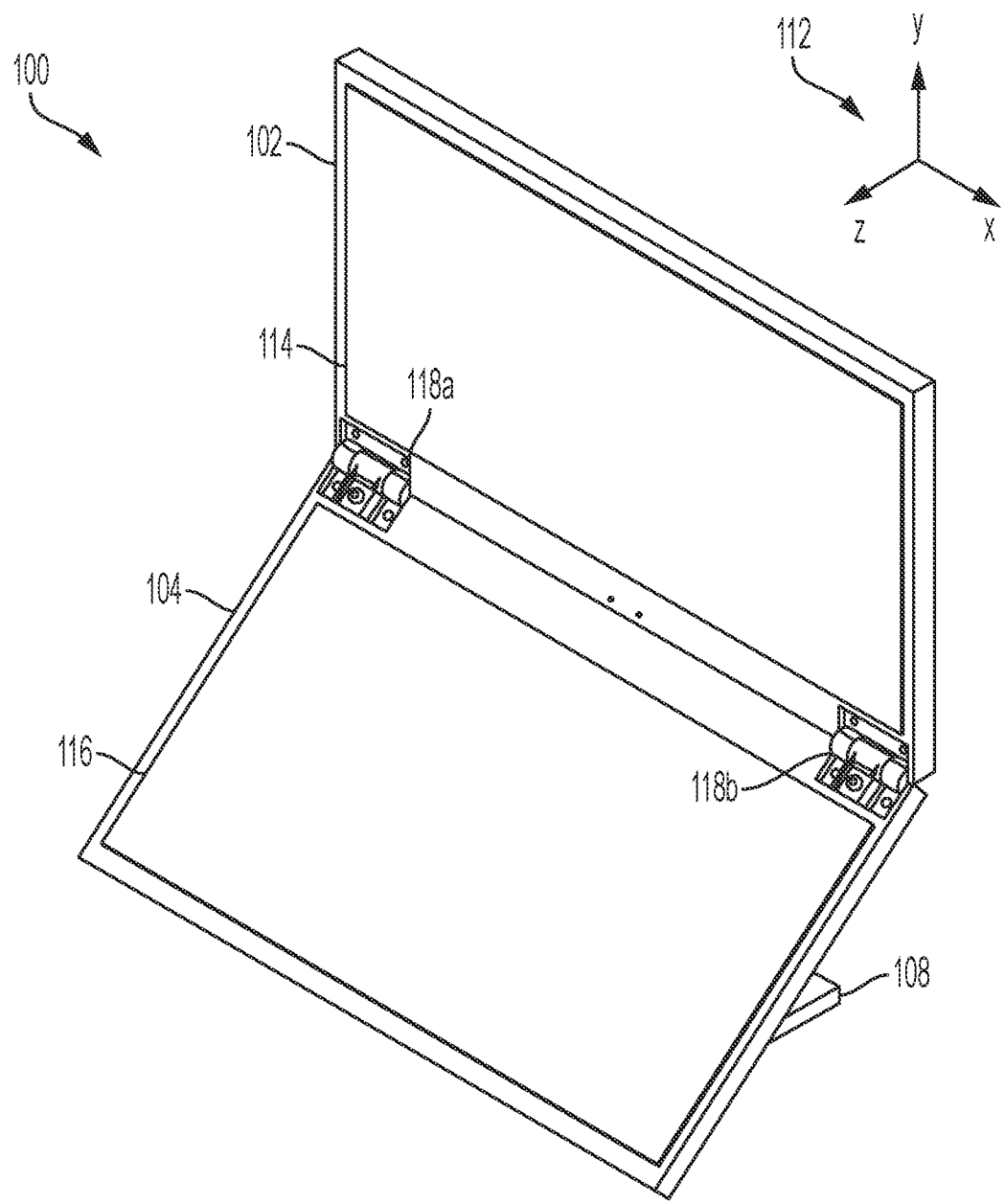
FIG. 1A illustrates a front-perspective view of a display system in a partially open orientation according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Electronic-device displays, such as computer monitors, display information to users. For example, a desktop computer may be communicatively and/or electrically coupled to a desktop-computer monitor. The desktop-computer monitor receives information from the desktop computer and displays the information to a user. In some examples, the desktop-computer monitor may include user-interface elements (for example, a touch-sensitive screen) and may send input information received from the user to the desktop computer.

As a size of a computer monitor increases, the monitor may be able to display more information to a user. Some users utilize multiple monitors to increase an amount of information that may be concurrently displayed. For example, a user may position two or more monitors adjacent to one another on a work surface, as it may not be feasible to position two or more separate monitors above one another.

Examples of the disclosure include a foldable display system having multiple displays rotatably coupled to one another. The displays may be communicatively and/or electrically coupled to at least one computing device (for example, a laptop computer, a desktop computer, a tablet computer, and so forth) configured to provide information to the displays. At least one of the displays may be slidably coupled to a support, and at least one of the displays may be rotatably coupled to the support via a linkage bar. The linkage bar links a sliding motion of one display to rotation of another display. For example, sliding at least one of the displays along the support may cause the displays to rotate relative to one another via the rotation mechanisms and/or linkage bar. A user may therefore be able to move the displays to a desired orientation. In various examples, the displays may be capable of being rotated until they are contacting one another in a closed position. In the closed position, the displays may be parallel to a work surface on which the display system is positioned.

Figure 1B:
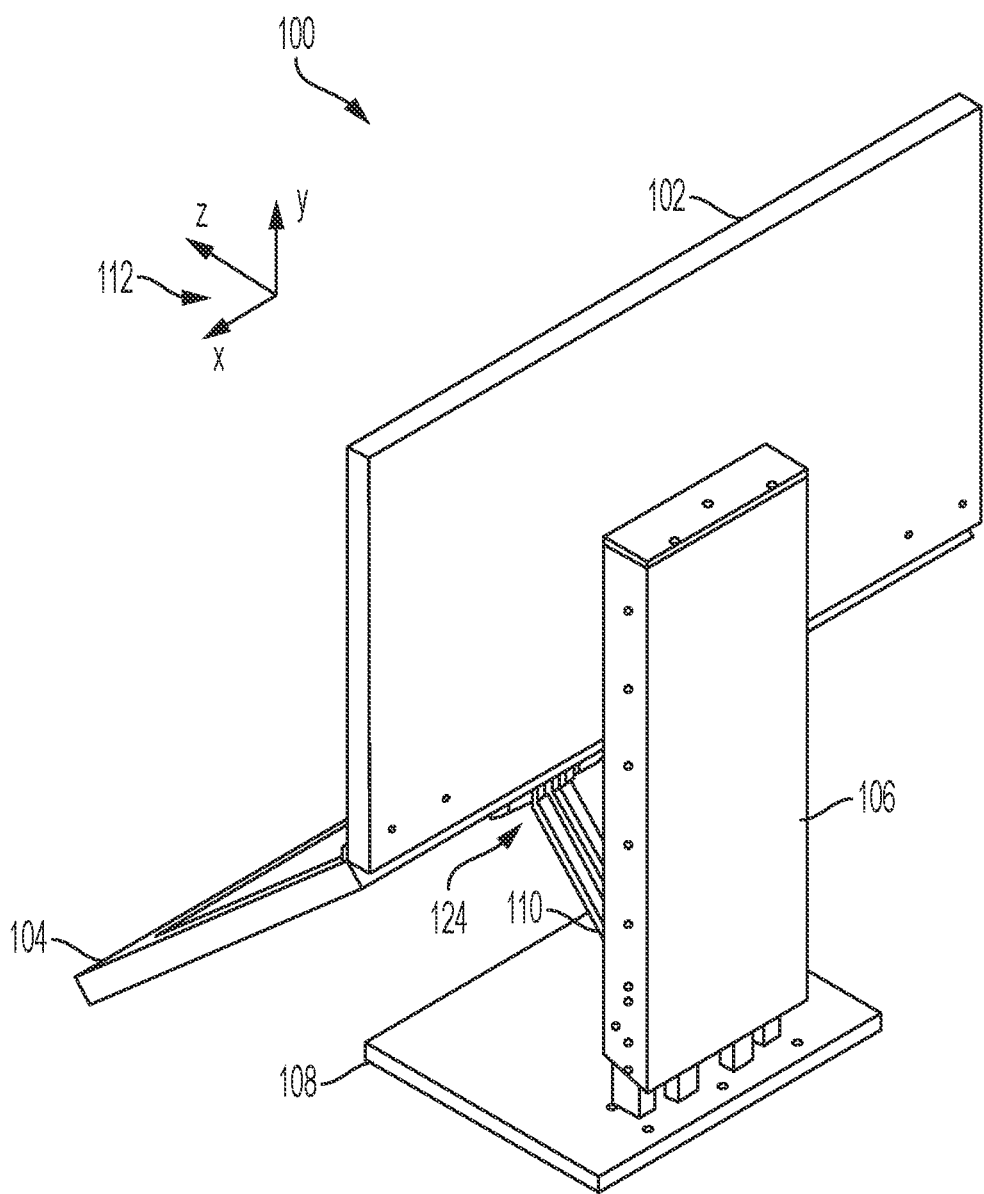
FIG. 1B illustrates a back-perspective view of the display system in the partially open orientation according to the example of FIG. 1A.
Figure 1C:
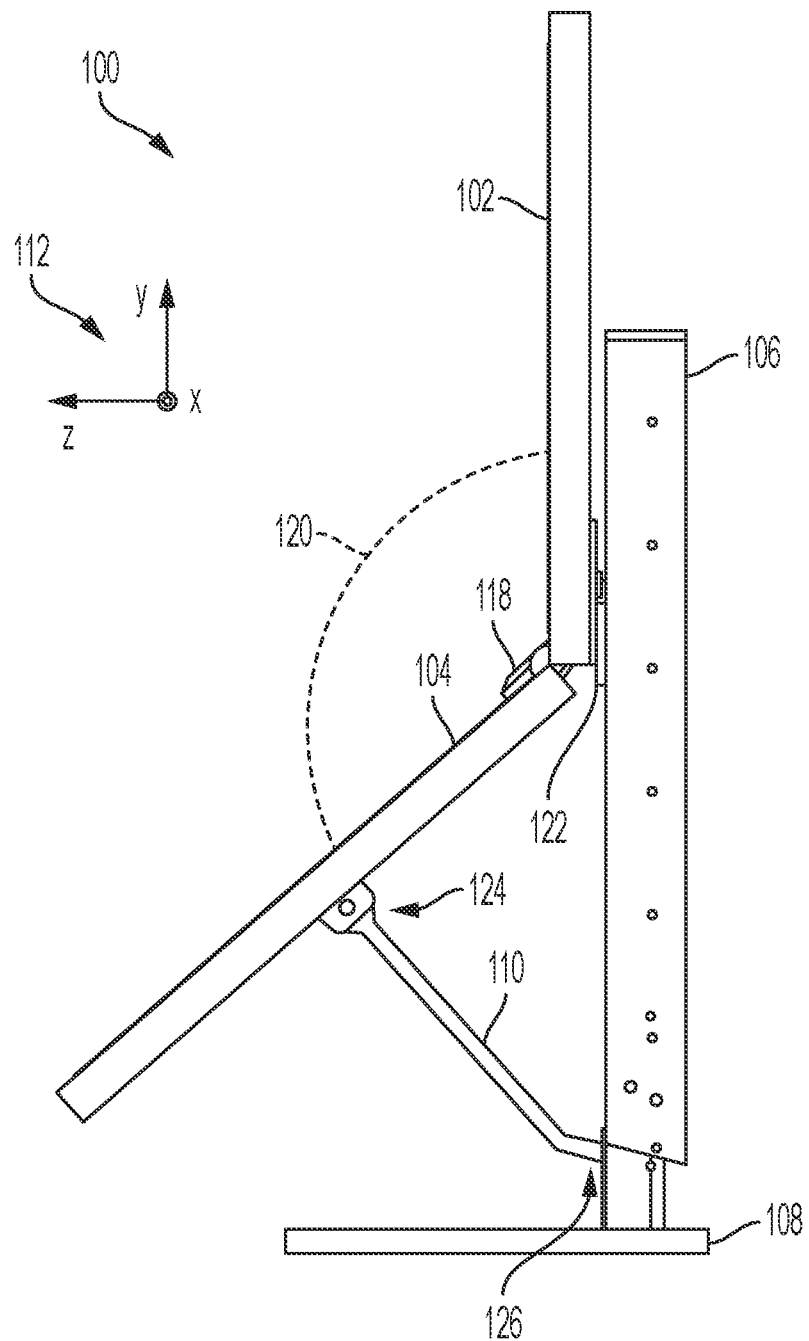
FIG. 1C illustrates a right-side view of the display system in the partially open orientation according to the example of FIG. 1A.
Figure 1D:
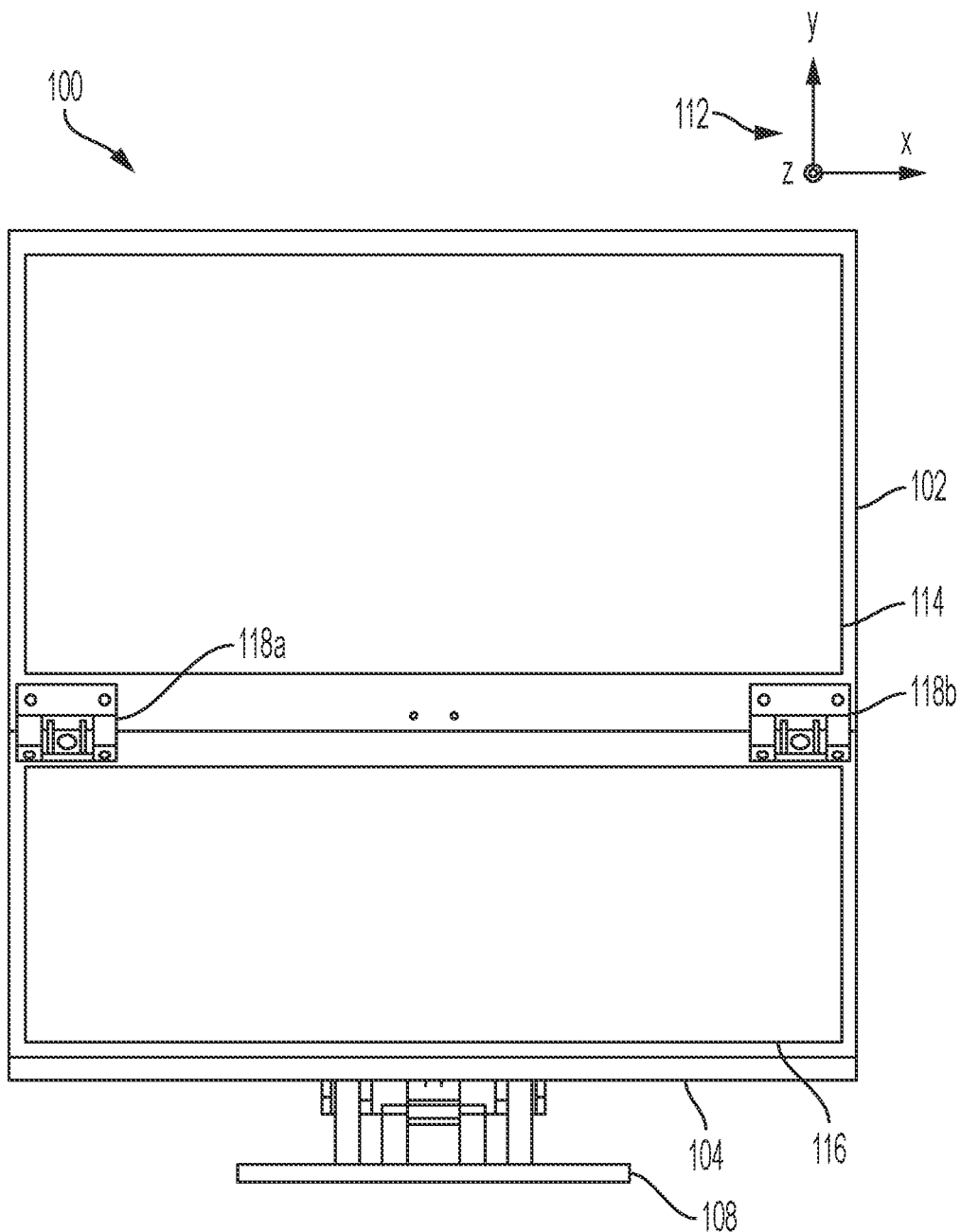
FIG. 1D illustrates a front view of the display system in the partially open orientation according to the example of FIG. 1A.
Figure 1E:
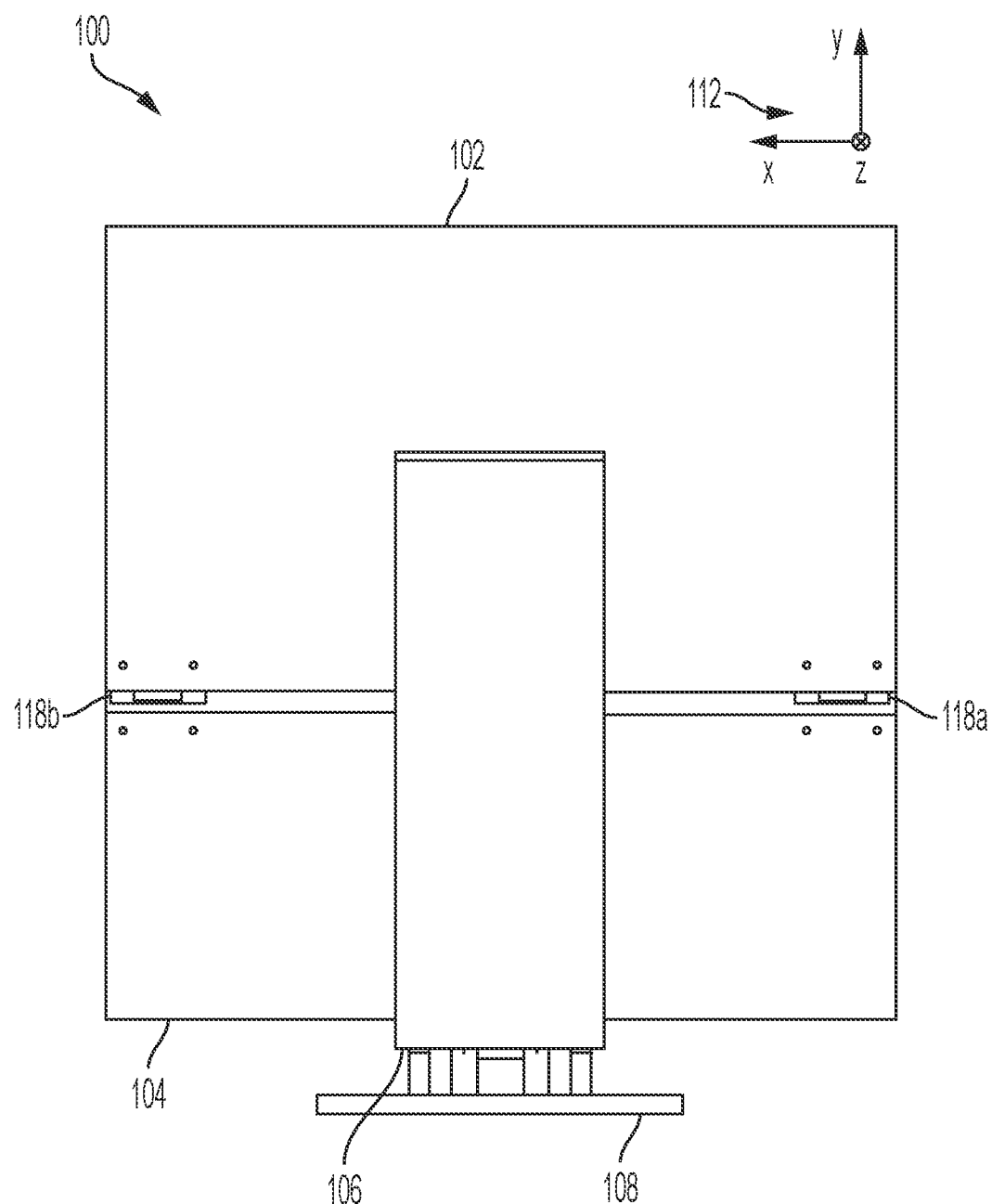
FIG. 1E illustrates a back view of the display system in the partially open orientation according to the example of FIG. 1A.

FIG. 1A illustrates a front-perspective view of a display system 100 in a partially open orientation according to an example. FIG. 1B illustrates a back-perspective view of the display system 100 in the partially open orientation according to the example of FIG. 1A. FIG. 1C illustrates a right-side view of the display system 100 in the partially open orientation according to the example of FIG. 1A. FIG. 1D illustrates a front view of the display system 100 in the partially open orientation according to the example of FIG. 1A. FIG. 1E illustrates a back view of the display system 100 in the partially open orientation according to the example of FIG. 1A. As discussed in greater detail below, the partially open orientation may include any orientation of the display system 100 between a minimally open orientation and a fully open orientation.

The display system 100 includes a first display 102, a second display 104, a support 106, a base 108, and a linkage bar 110. Aspects of the display system 100 are described relative to a legend 112 illustrating an x-axis, a y-axis, and a z-axis. The first display 102 includes a first display screen 114, and the second display 104 includes a second display screen 116. The first display 102 is rotatably coupled to the second display 104 via a first hinge 118a and a second hinge 118b (collectively, "hinges 118") about the x-axis to adjust an orientation angle 120 between the screens 114, 116. In some examples, the hinges 118 include torque hinges configured to maintain a desired value of the orientation angle 120 between the displays 102, 104. In various examples, the hinges 118 may or may not include torque hinges, and the linkage bar 110 may be configured to maintain a desired value of the orientation angle 120 by opposing a gravitational moment on the second display 104 about the hinges 118. In various implementations, the hinges 118 may be implemented with hinge pins, a flexible (for example, foldable) material, or other types of components capable of facilitating an articulable connection between the displays 102, 104. Accordingly, the hinges 118 may be referred to as "articulable hinges." As discussed in greater detail below, in some examples, a single foldable display having multiple display sections may be implemented in lieu of, or in addition to, the displays 102, 104.

The first display 102 is slidably coupled to the support 106 along the y-axis. The first display 102 includes a sliding coupler 122 configured to mate with one or more tracks in the support 106 (not illustrated in FIGS. 1A-1E) to enable movement of the first display 102 along the y-axis. The linkage bar 110 includes a first end 124 rotatably coupled to the second display 104, and a second end 126 rotatably coupled to the support 106. In some examples, the support 106 may include the linkage bar 110. The linkage bar 110 facilitates rotation of the second display 104 about the first display 102 to adjust the orientation angle 120. For example, a user may slide the first display 102 upwards or downwards (that is, along the y-axis or −y-axis, respectively) along the support 106 via the sliding coupler 122 to adjust a position of the displays 102, 104 along the y-axis. As discussed below, adjusting the position of the displays 102, 104 along the y-axis may adjust the orientation angle 120. In various examples, the linkage bar 110 facilitates adjustment of the orientation angle 120 by linking movement of the first display 102 along the y-axis to rotation of the second display 104 about the x-axis.

In some examples, the first display 102 and the second display 104 may be removably coupled to other components of the display system 100, such as the support 106, the base 108, and the linkage bar 110. That is, in some examples, the first display 102 and the second display 104 may be physically decoupled, directly and indirectly, from other components of the display system 100, such as the support 106, the base 108, and the linkage bar 110. As discussed above, the first display 102 may be configured to be slidably coupled to one or more tracks in the support 106 via the sliding coupler 122.

In some examples, the first display 102 includes or is coupled to the sliding coupler 122 and the sliding coupler 122 is removable from the one or more tracks in the support 106, such that the first display 102 may be physically decoupled from the support 106. In some examples, the second display 104 is removably coupled to the first end 124 of the linkage bar 110 such that the second display 104 may be physically decoupled from the linkage bar 110. The removable physical couplings may include one or more removable fasteners including, for example, screws, hook-and-loop, interference fits, and so forth.

Accordingly, in some examples, the displays 102, 104 may be physically decoupled from and/or coupled to other components of the display system 100 such that, for example, the displays 102, 104 may be acquired by a user (for example, purchased by a user) separately from other components of the display system 100, such as the support 106, the base 108, and the linkage bar 110. In various examples, the components from which the displays 102, 104 may be physically decoupled, such as the support 106, base 108, and the linkage bar 110, may be collectively referred to as a "stand," an "auxiliary-display stand," an "auxiliary-monitor stand," and so forth. In some implementations, therefore, the displays 102, 104 are provided to display information and other components in the display system 100 are provided to support the displays 102, 104, including by providing physical support, electrical and data connections, and so forth. In other examples additional or different components may be removably decoupled from and/or coupled to other components.

In various examples, the display system 100 may be communicatively and/or electrically coupled to at least one computing device, such as a laptop computer, desktop computer, tablet computer, smartphone, video-game console, and so forth. For example, the base 108 may include one or more wired and/or wireless communication and/or electrical interfaces, such as power ports, wired-communication ports, antennas, wireless-charging coils, and so forth, to enable communicative and/or electrical coupling between the display system 100 and at least one computing device. The base 108 may include and/or be coupled to one or more media to transmit power and/or information to other components of the display system 100, such as the displays 102, 104. For example, the base 108 may include one or more conductive media, such as cables or wires, to transmit power and/or information from the base 108 to the displays 102, 104.

The displays 102, 104 may receive output information from at least one computing device coupled to the display system 100 and display information based on the received output information. For example, the base 108 may be placed on a work surface in the xz-plane, and a user working at the work surface may view information displayed by the displays 102, 104. In some examples, one or both of the displays 102, 104 may be configured to receive user-input information. For example, one or both of the display screens 114, 116 may include a touch-sensitive display screen, such that a user may provide touch inputs to the display system 100 via the display screens 114, 116.

A user may adjust a position and/or orientation of the displays 102, 104 at least by exerting an upwards (that is, along the y-axis) or downwards (that is, along the −y-axis) force on the first display 102. In various examples, exerting an upwards force on the first display 102 (for example, pulling the first display 102 up) increases the orientation angle 120, and exerting a downwards force on the first display 102 (for example, pushing the first display 102 down) decreases the orientation angle 120.

For example, exerting an upwards force on the first display 102 enables the first display 102 to slide upwards (that is, along the y-axis) along the support 106 via the sliding coupler 122. As the first display 102 moves upwards along the y-axis, the first display 102 exerts an upwards force on the second display 104 via the hinges 118. The upwards force on the second display 104 moves the second display 104 along the y-axis and, in conjunction with the linkage bar 110, induces a counterclockwise moment on the second display 104 at the hinges 118 about the x-axis. As the second display 104 moves along the y-axis, the counterclockwise moment on the second display 104 causes the second display 104 to rotate counterclockwise about the x-axis via the hinges 118.

The movement of the second display 104 along the y-axis and rotation of the second display 104 about the x-axis exerts an upwards force on the linkage bar 110 along the y-axis where the first end 124 couples to the second display 104. The upwards force on the linkage bar 110 exerts a clockwise moment on the linkage bar 110 about the x-axis. As the second display 104 moves along the y-axis, the clockwise moment on the linkage bar 110 causes the linkage bar 110 to rotate clockwise about the x-axis via hinges rotatably coupling the second end 126 of the linkage bar 110 to the support 106. The linkage bar 110 also rotates clockwise relative to the second display 104 about the x-axis via hinges rotatably coupling the first end 124 of the linkage bar 110 to the second display 104.

Figure 2A:
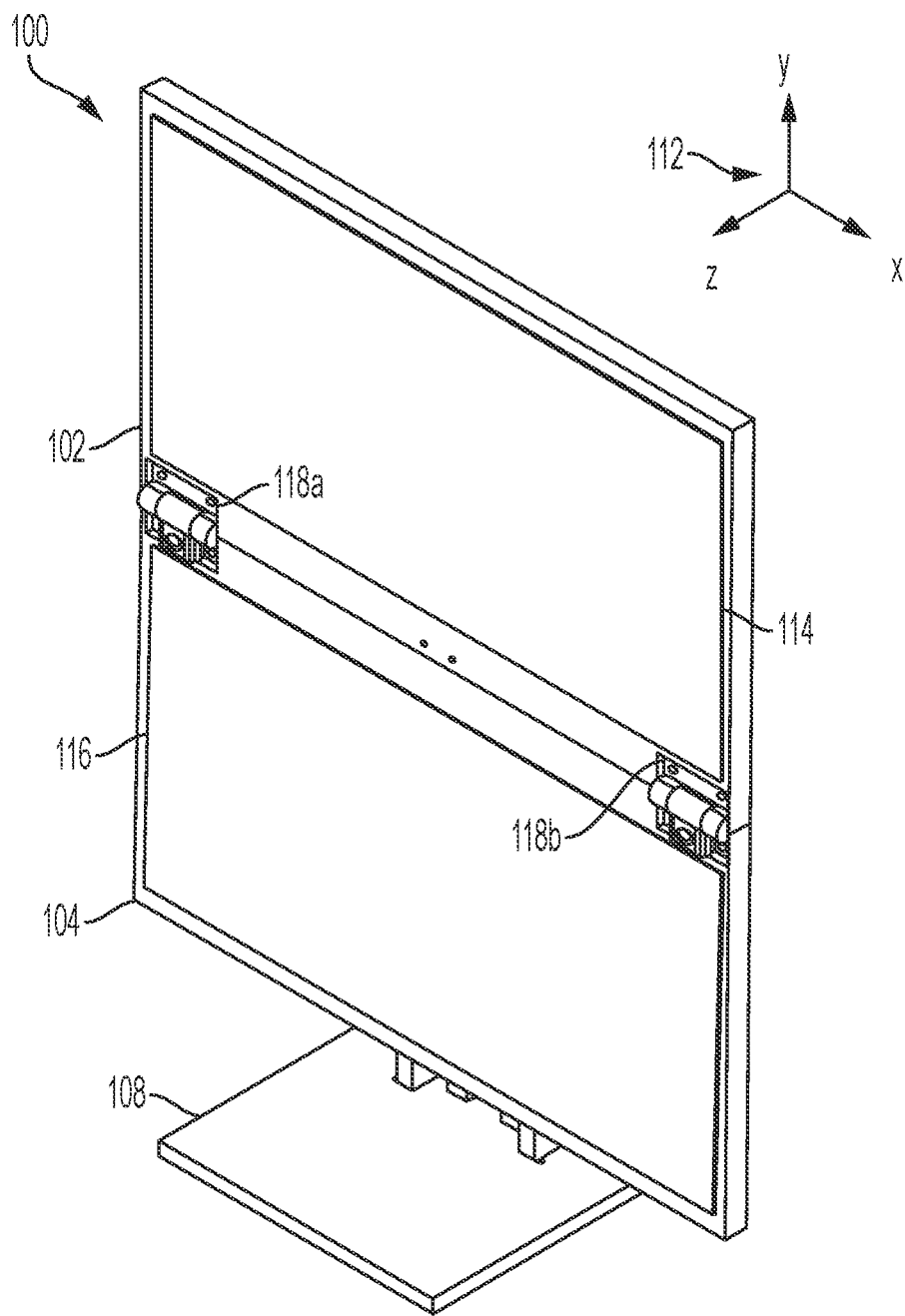
FIG. 2A illustrates a front-perspective view of the display system in a fully open orientation according to an example.
Figure 2B:
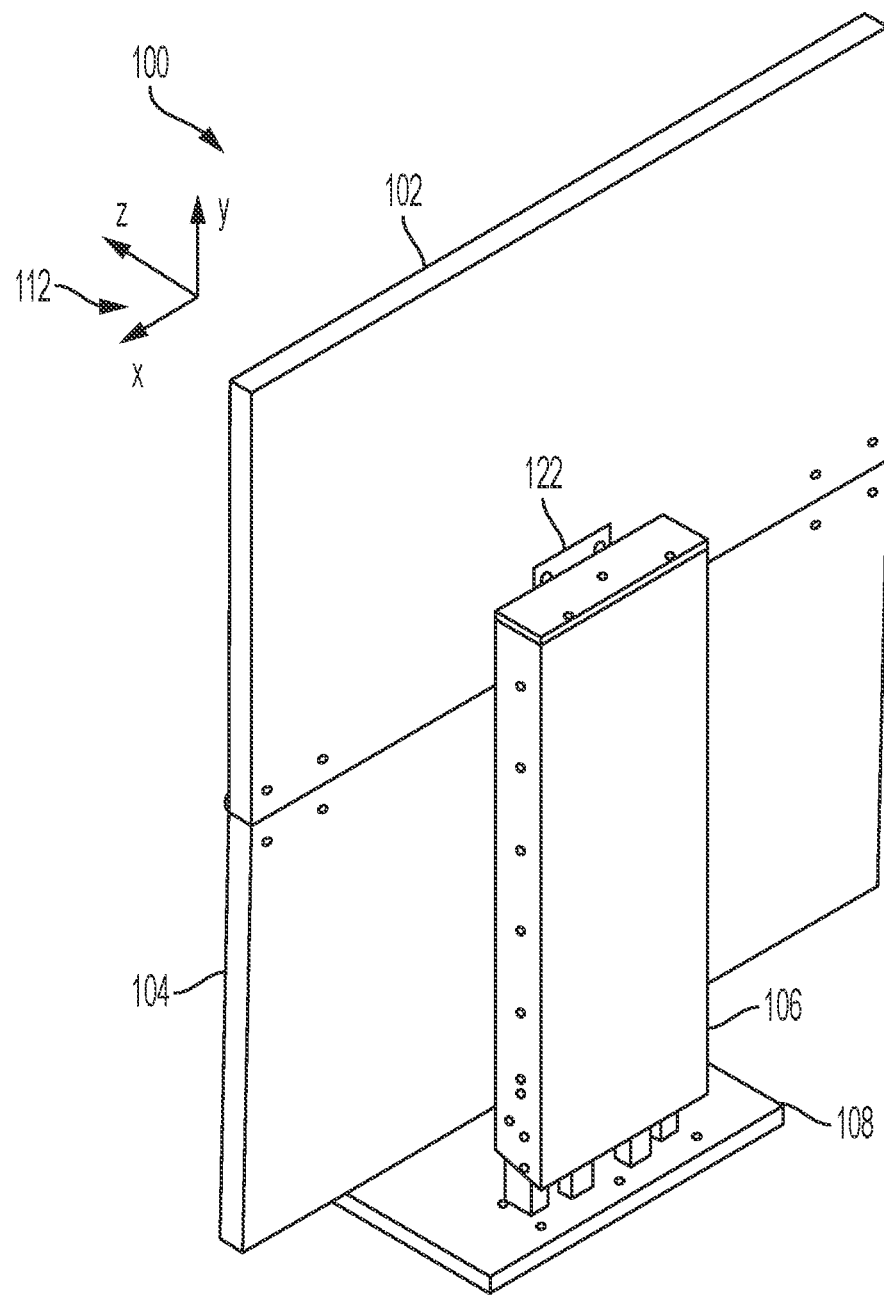
FIG. 2B illustrates a back-perspective view of the display system in the fully open orientation according to the example of FIG. 2A.
Figure 2C:
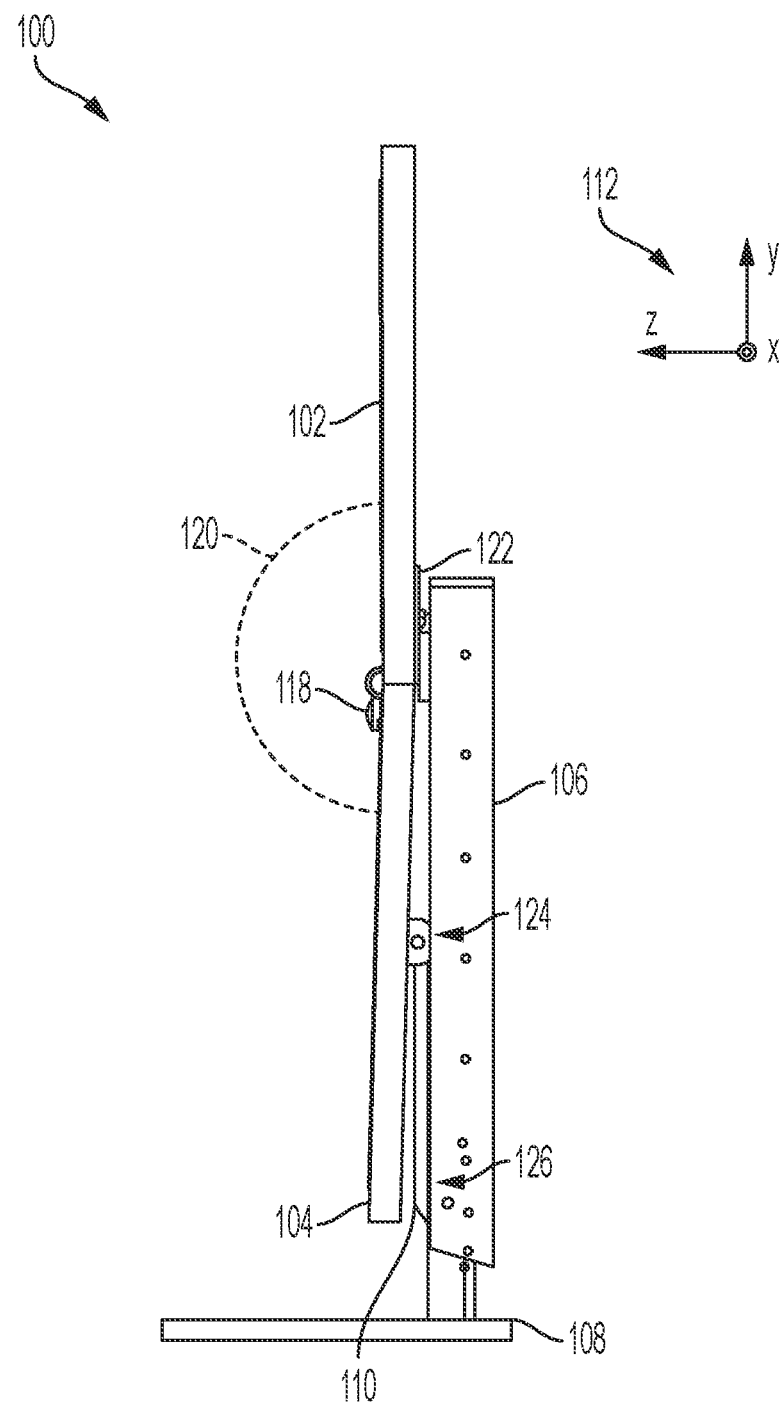
FIG. 2C illustrates a right-side view of the display system in the fully open orientation according to the example of FIG. 2A.
Figure 2D:
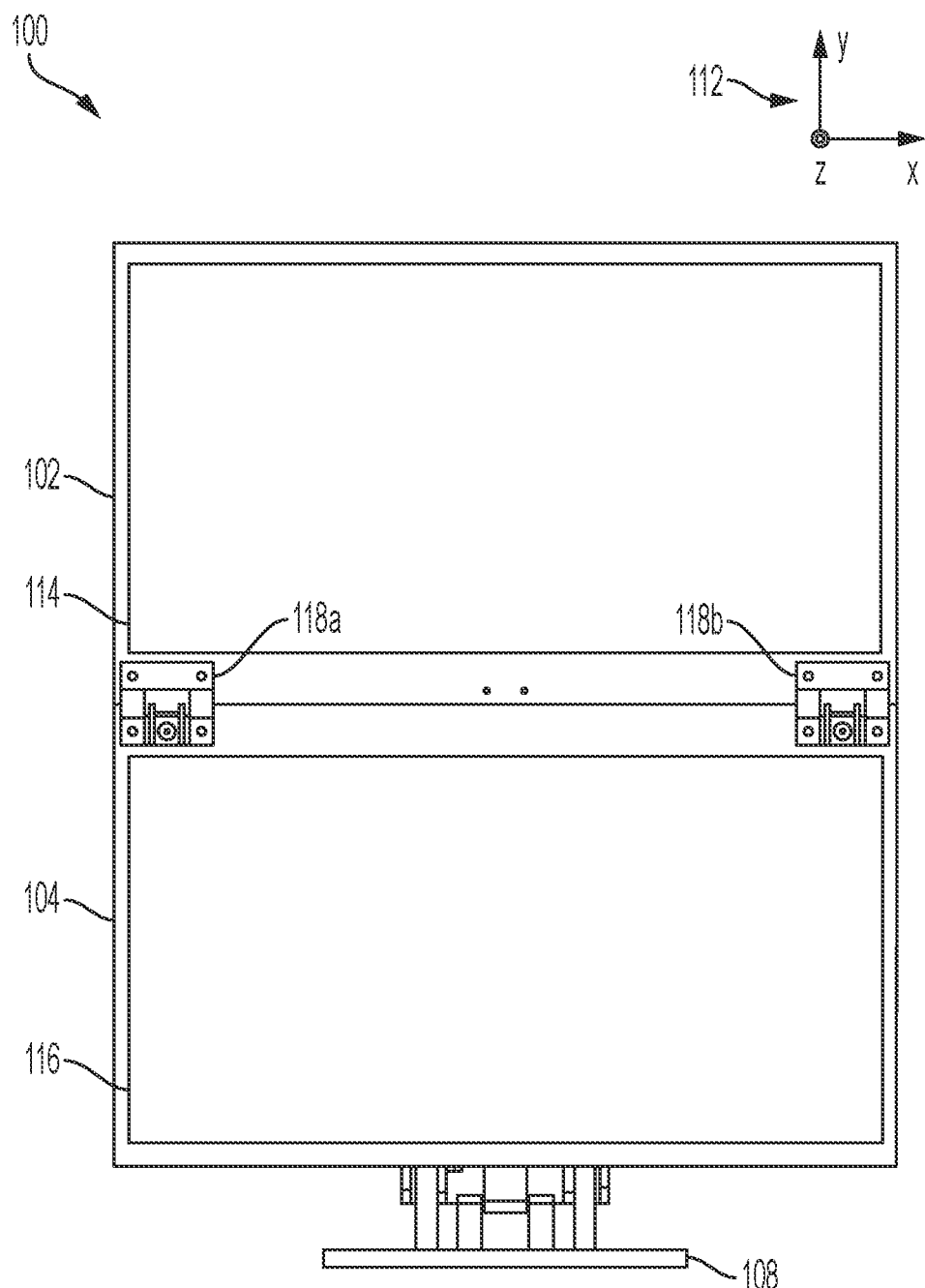
FIG. 2D illustrates a front view of the display system in the fully open orientation according to the example of FIG. 2A.
Figure 2E:
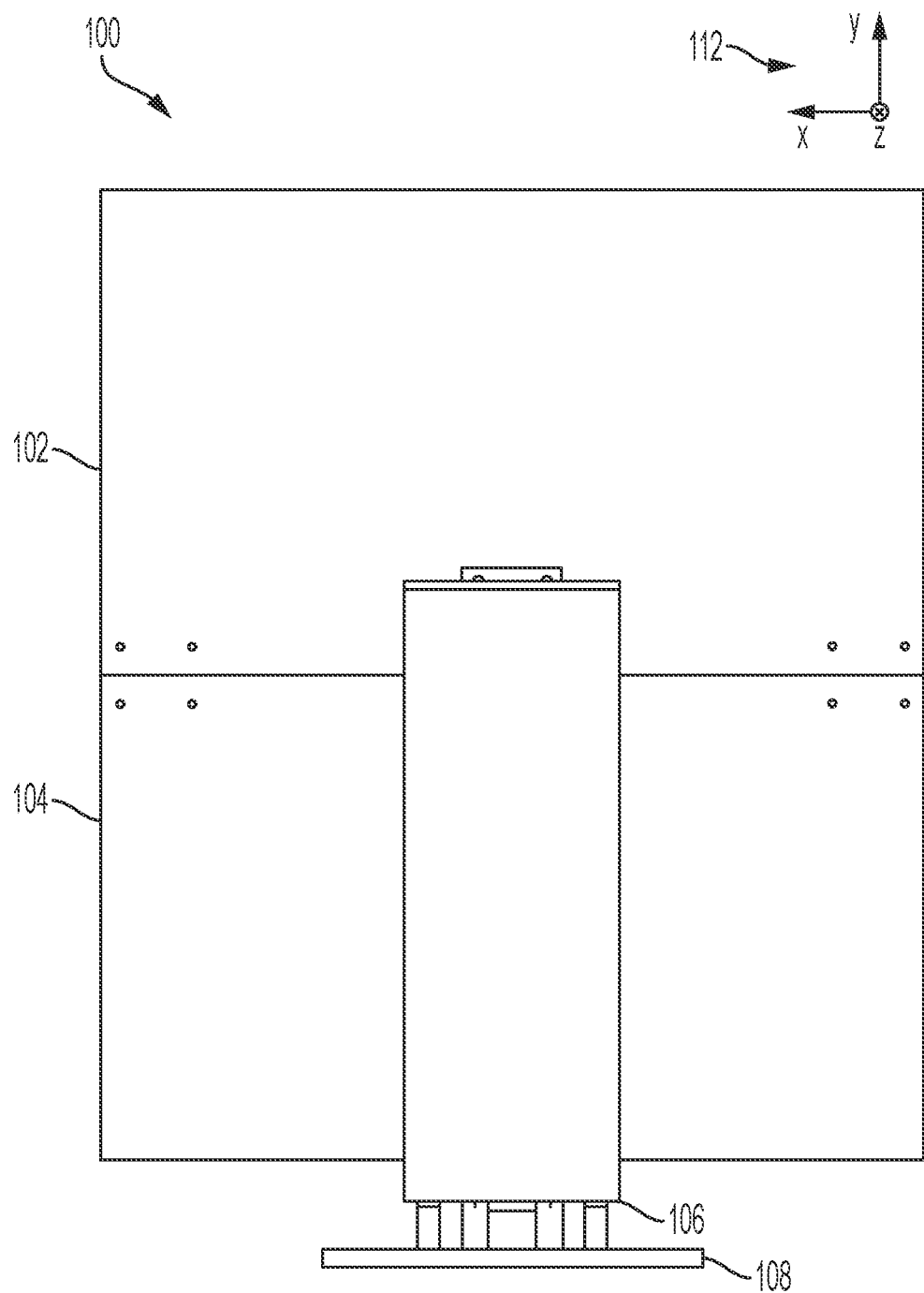
FIG. 2E illustrates a back view of the display system in the fully open orientation according to the example of FIG. 2A.

The first display 102 may be slid upwards along the support 106 until a maximum display orientation angle of the orientation angle 120 is reached, at which point the display system 100 may be considered to be in a fully open orientation. FIG. 2A illustrates a front-perspective view of the display system 100 in the fully open orientation according to an example. FIG. 2B illustrates a back-perspective view of the display system 100 in the fully open orientation according to the example of FIG. 2A. FIG. 2C illustrates a right-side view of the display system 100 in the fully open orientation according to the example of FIG. 2A. FIG. 2D illustrates a front view of the display system 100 in the fully open orientation according to the example of FIG. 2A. FIG. 2E illustrates a back view of the display system 100 in the fully open orientation according to the example of FIG. 2A.

In the fully open orientation, the orientation angle 120 may be slightly less than 180°. For example, were the orientation angle 120 exactly 180°, then a downwards force exerted on the first display 102 along the −y-axis may intersect a rotation axis of the hinges 118 and thus not induce a moment about the x-axis, which may be undesirable. In other examples, a position of the hinges 118 may be selected such that a downwards force exerted on the first display 102 along the −y-axis does not intersect a rotation axis of the hinges 118 even if the orientation angle 120 is 180°, however. The maximum display orientation angle may be dictated at least in part by the linkage bar 110 which, as illustrated in FIG. 2C, provides physical separation between the second display 104 and the support 106. For example, the linkage bar 110 may exert a force on the second display 104 approximately along the z-axis to induce a clockwise moment on the second display 104 about the hinges 118, and thereby prevent the second display 104 from rotating past the maximum display orientation angle.

Exerting a downwards force on the first display 102 while the display system 100 is in the partially or fully open orientation enables the first display 102 to slide downwards (that is, along the −y-axis) along the support 106 via the sliding coupler 122. As the first display 102 moves downwards along the −y-axis, the first display 102 exerts a downwards force on the second display 104 via the hinges 118. The downwards force on the second display 104 moves the second display 104 along the −y-axis and, at least at certain angles, induces a clockwise moment on the second display 104 about the x-axis. As the second display 104 moves along the −y-axis, the clockwise moment on the second display 104 causes the second display 104 to rotate clockwise about the x-axis via the hinges 118.

The movement of the second display 104 along the −y-axis and rotation of the second display 104 about the x-axis exerts a downwards force on the linkage bar 110 along the −y-axis where the first end 124 couples to the second display 104. The downwards force on the linkage bar 110 exerts a counterclockwise moment on the linkage bar 110 about the x-axis. As the second display 104 moves along the −y-axis, the counterclockwise moment on the linkage bar 110 causes the linkage bar 110 to rotate counterclockwise about the x-axis via hinges rotatably coupling the second end 126 of the linkage bar 110 to the support 106. The linkage bar 110 also rotates relative to the second display 104 about the x-axis via hinges rotatably coupling the first end 124 of the linkage bar 110 to the second display 104.

The first display 102 may be slid downwards along the support 106 until a minimum display orientation angle of the orientation angle 120 is reached, at which point the display system 100 may be considered to be in a minimally open orientation. Although the display system 100 may support a value of the orientation angle 120 being less than the minimum display orientation angle, as discussed below with respect to FIGS. 4A-4E, the minimum display orientation angle may represent a minimum value of the orientation angle 120 while a user is actively viewing information displayed by the displays 102, 104. For example, as discussed in greater detail below, the minimum display orientation angle may represent a minimum value of the orientation angle 120 while the support 106 remains upright along the y-axis and before rotating about the x-axis towards a work surface on which the base 108 may be positioned. However, in various examples a user may be capable of operating the display system 100 at orientation angles less than the minimum display orientation angle.

Figure 3A:
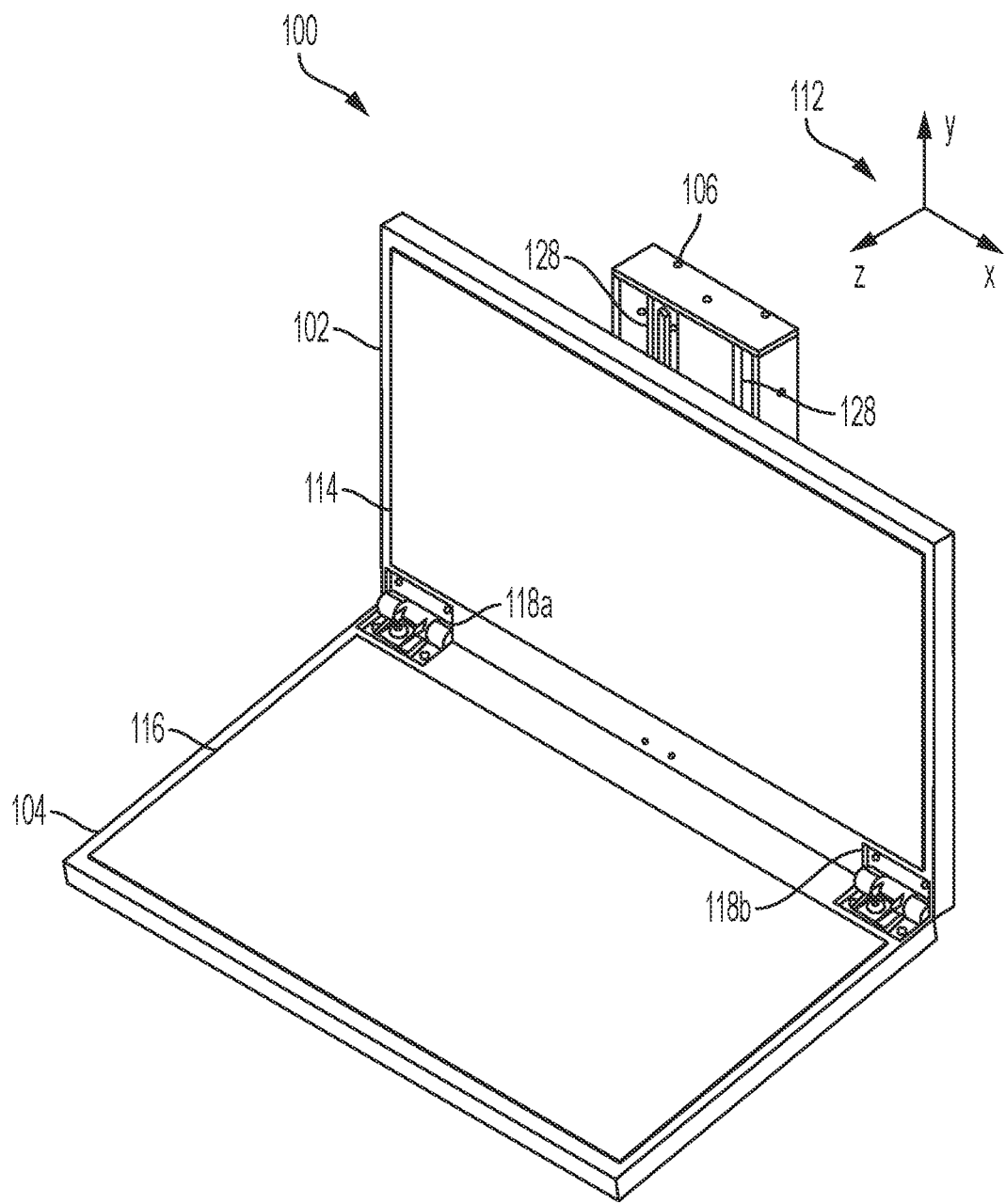
FIG. 3A illustrates a front-perspective view of the display system in a minimally open orientation according to an example.
Figure 3B:
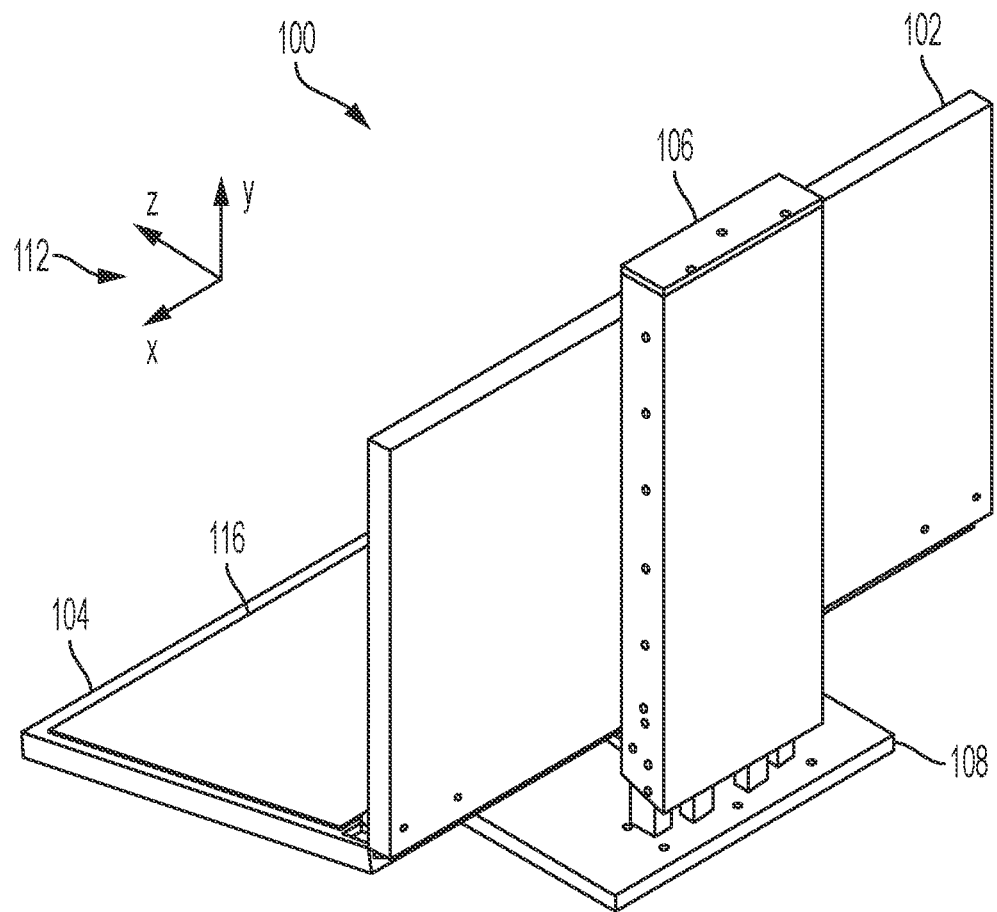
FIG. 3B illustrates a back-perspective view of the display system in the minimally open orientation according to the example of FIG. 3A.
Figure 3C:
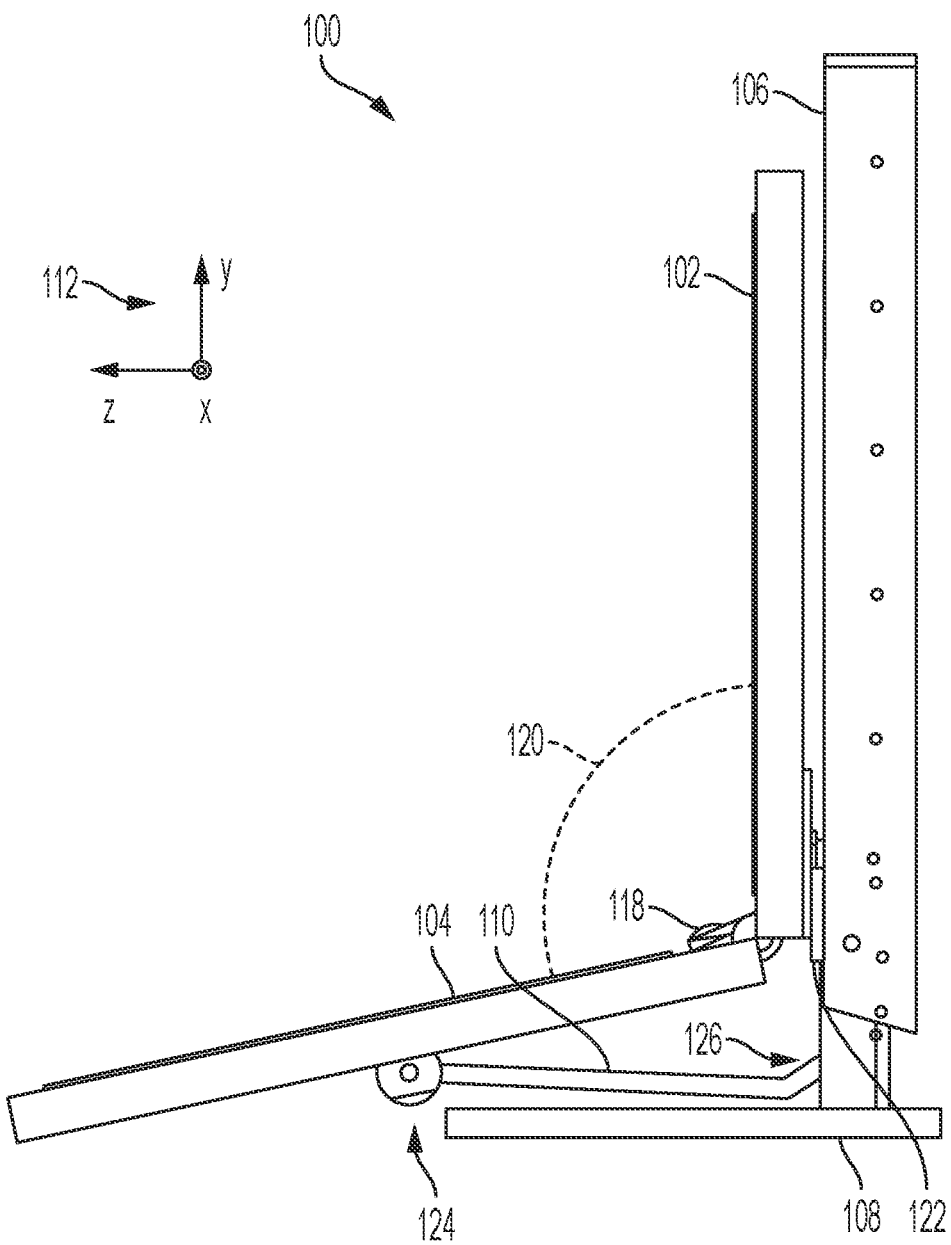
FIG. 3C illustrates a right-side view of the display system in the minimally open orientation according to the example of FIG. 3A.
Figure 3D:
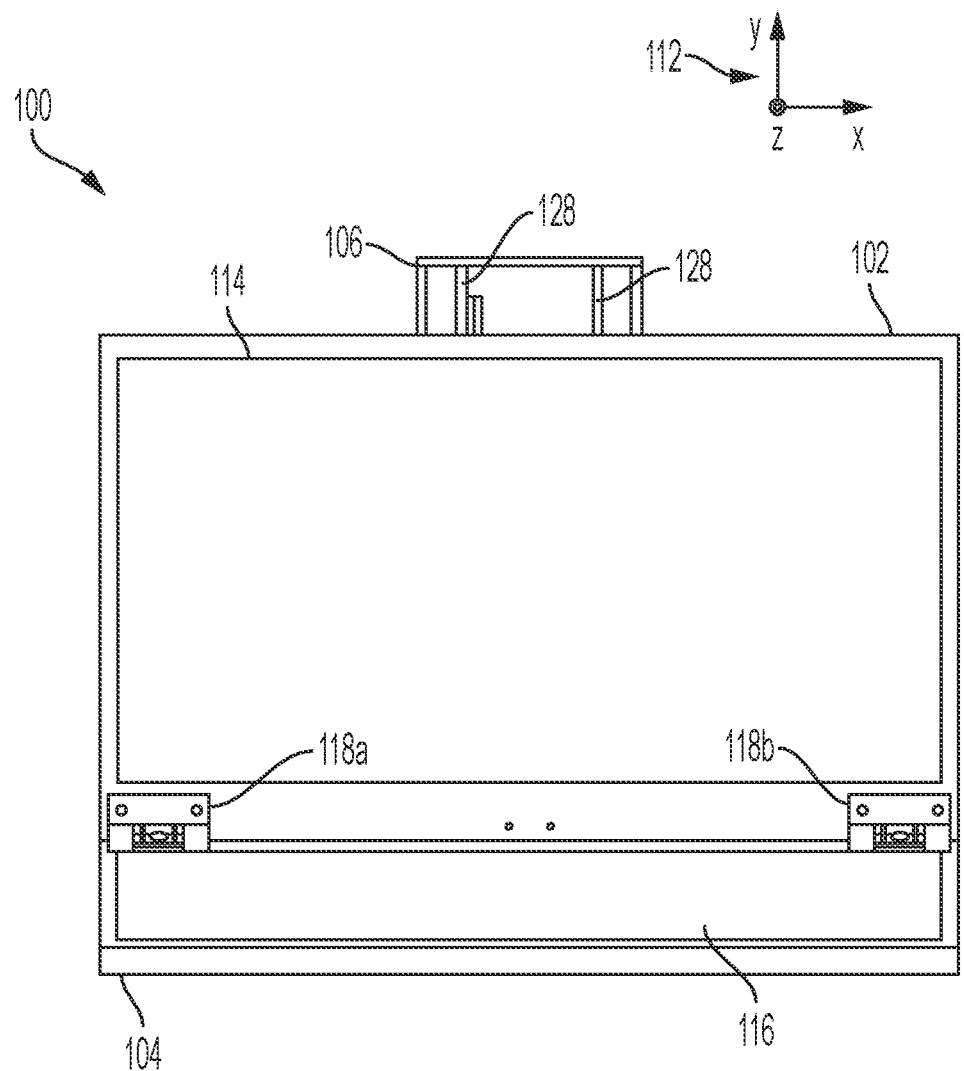
FIG. 3D illustrates a front view of the display system in the minimally open orientation according to the example of FIG. 3A.
Figure 3E:
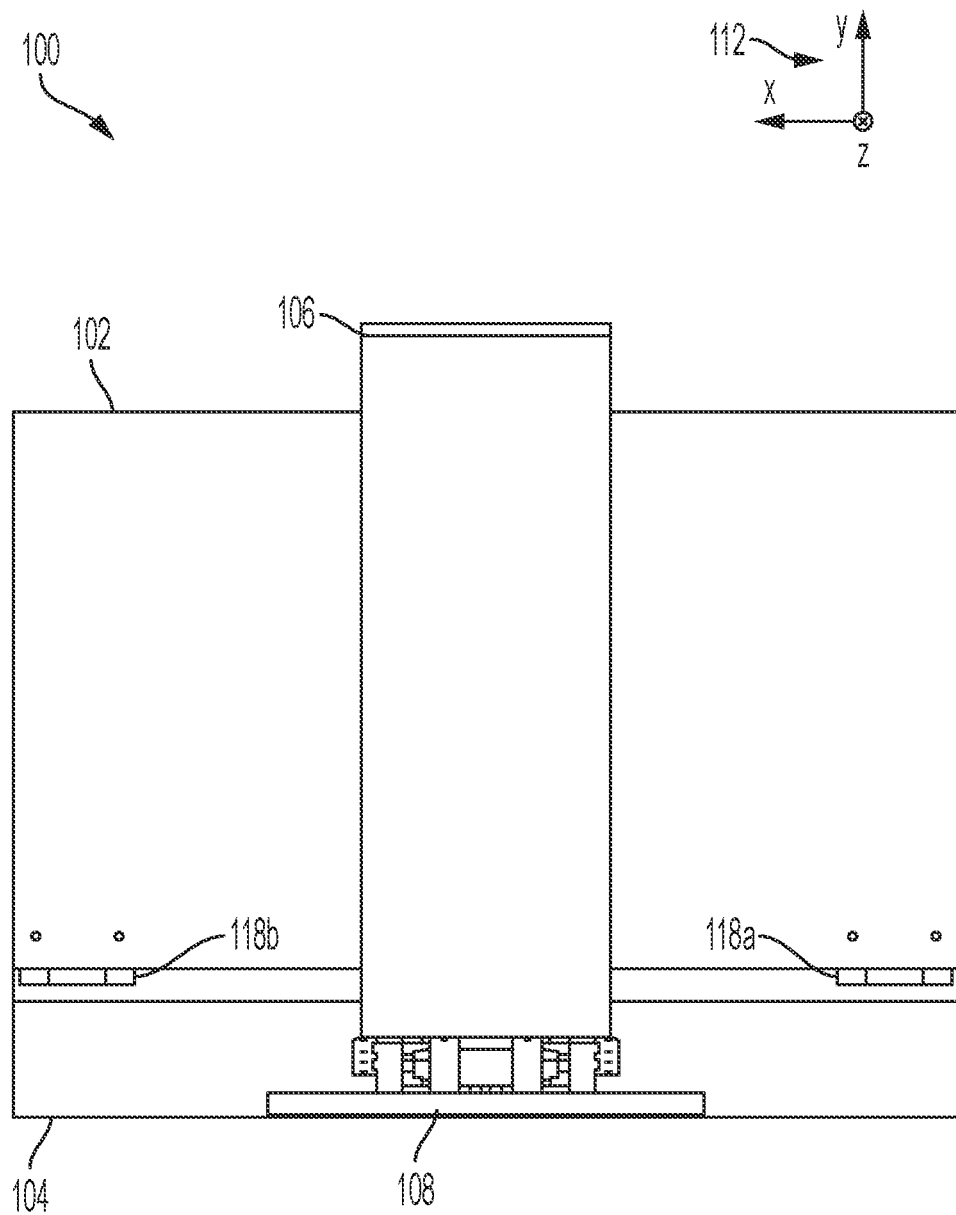
FIG. 3E illustrates a back view of the display system in the minimally open orientation according to the example of FIG. 3A.

FIG. 3A illustrates a front-perspective view of the display system 100 in the minimally open orientation according to an example. FIG. 3B illustrates a back-perspective view of the display system 100 in the minimally open orientation according to the example of FIG. 3A. FIG. 3C illustrates a right-side view of the display system 100 in the minimally open orientation according to the example of FIG. 3A. FIG. 3D illustrates a front view of the display system 100 in the minimally open orientation according to the example of FIG. 3A. FIG. 3E illustrates a back view of the display system 100 in the minimally open orientation according to the example of FIG. 3A.

In the minimally open orientation, the orientation angle 120 may be approximately 90° in some examples. In other examples, the orientation angle 120 may be slightly greater than 90°. As discussed above, and as illustrated at least in FIG. 3A, the support 106 includes tracks 128 to which the sliding coupler 122 may be slidably coupled. In at least one example, a coupling between the sliding coupler 122 and the tracks 128 may resist a force along the y-axis, such as a force of gravity exerted along the −y-axis, such that the sliding coupler 122 does not move along the tracks 128 unless an additional force is exerted, such as a user pushing or pulling the first display 102 along the y-axis. The minimally open orientation may represent a value of the orientation angle 120 at which the sliding coupler 122 cannot be slid further down along the −y-axis, for example, because the tracks 128 do not extend further along the −y-axis. Similarly, the fully open orientation may represent a value of the orientation angle 120 at which the sliding coupler 122 cannot be slid further up along the y-axis, for example, because the tracks 128 do not extend further along the y-axis.

As discussed in greater detail below, placing the display system 100 in the minimally open orientation may enable the support 106 to rotate about the x-axis. The support 106 may be rotatably coupled to the base 108 (either directly or via one or more components, as discussed below) about the x-axis via at least one hinge (not illustrated in FIGS. 3A-3E). In some examples, the at least one hinge may be configured to enable rotation of the support 106 responsive to a release bar (not illustrated in FIGS. 3A-3E) being activated. The support 106 may otherwise not be configured to rotate about the at least one hinge. The release bar may be activated when the display system 100 is placed in the minimally open orientation. Accordingly, the support 106 may be rotated relative to the base 108 responsive to the display system 100 being placed in the minimally open orientation. Rotating the support 106 about the x-axis enables the first display 102, which is slidably coupled to the support 106, to be rotated towards the second display 104 about the hinges 118.

The orientation angle 120 may therefore be decreased past the minimum display orientation angle at least in part by rotating the support 106 relative to the base 108 about the x-axis. In various examples, the support 106 may be rotated approximately 90° counterclockwise about the x-axis until the displays 102, 104 contact one another, at which point the display system 100 may be considered to be in a closed orientation. Some users may find orientation angles less than the minimum display orientation angle to be non-ideal angles at which to view information displayed by the displays 102, 104 because the information may not be displayed in a direction towards a user's eyes, though in various examples users may nonetheless use the display system 100 at such angles. However, rotating the support 106 about the x-axis may enable the display system 100 to be placed in a closed orientation, which may be advantageous where the display system 100 is not in use.

Figure 4A:
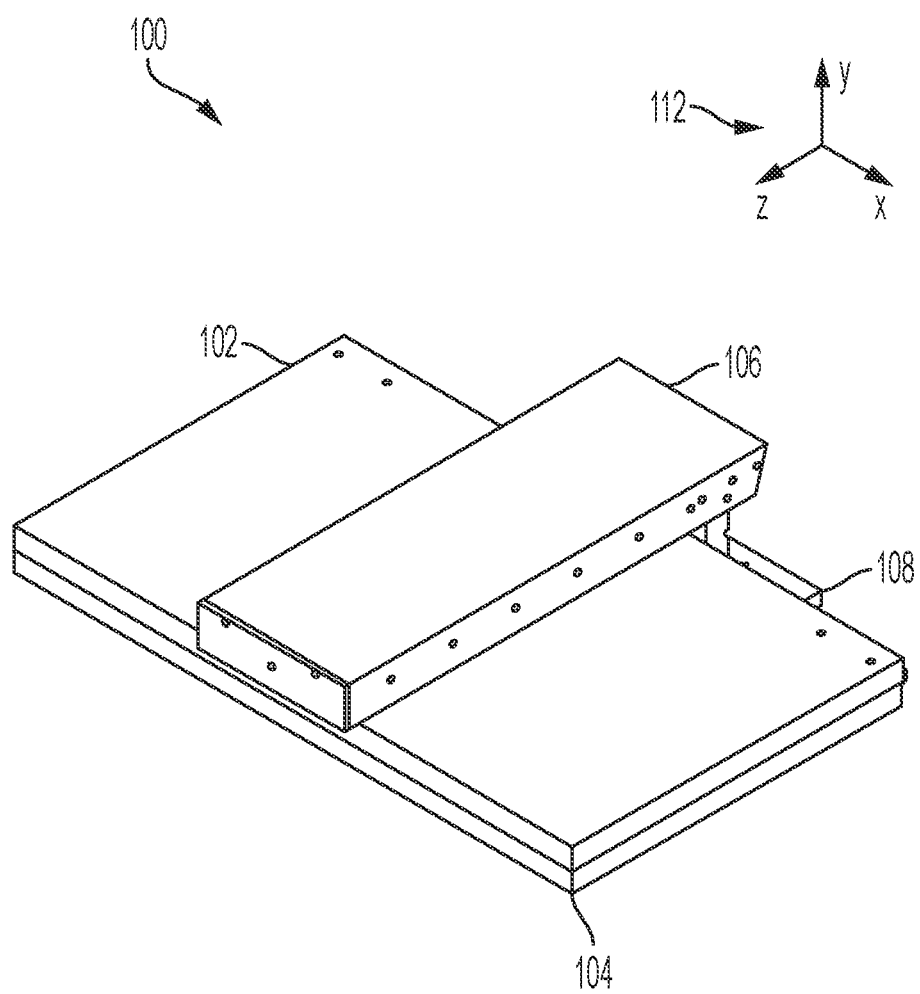
FIG. 4A illustrates a front-perspective view of the display system in a closed orientation according to an example.
Figure 4B:
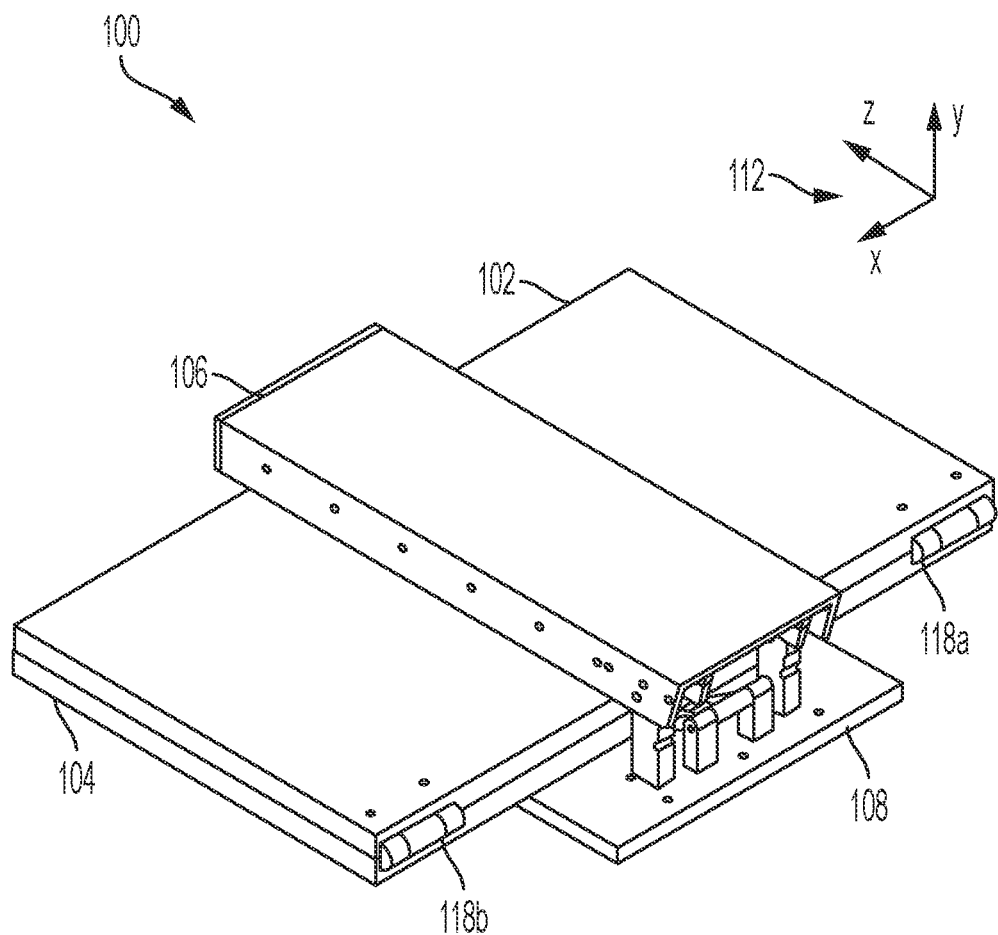
FIG. 4B illustrates a back-perspective view of the display system in the closed orientation according to the example of FIG. 4A.
Figure 4C:
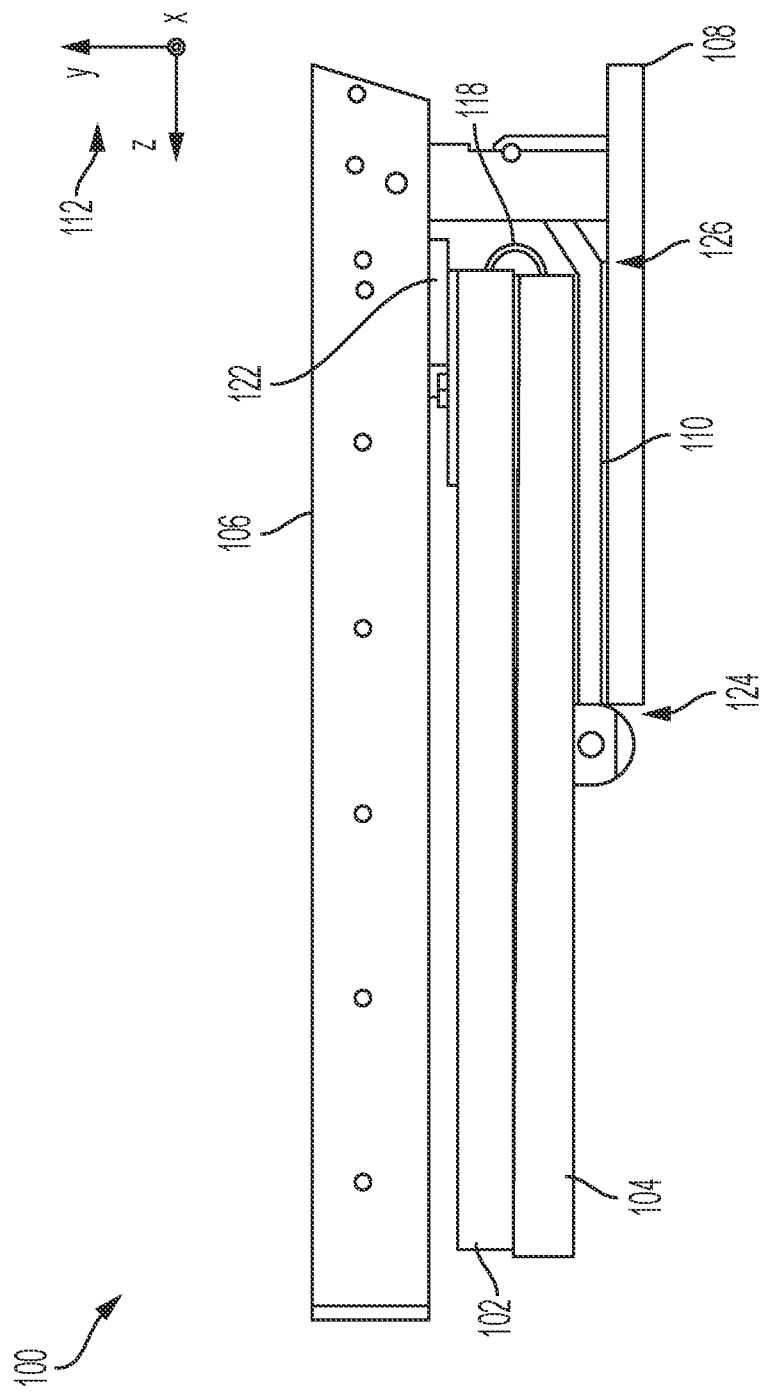
FIG. 4C illustrates a right-side view of the display system in the closed orientation according to the example of FIG. 4A.
Figure 4D:
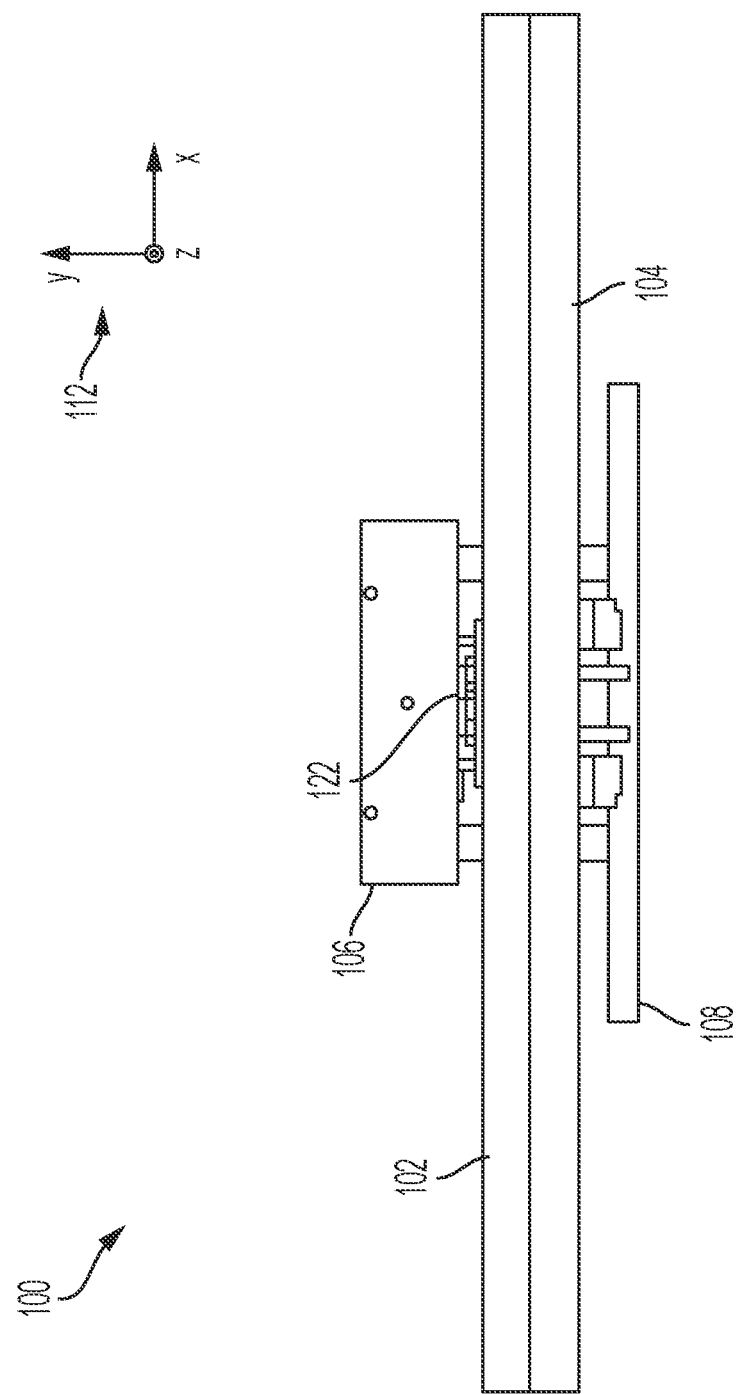
FIG. 4D illustrates a front view of the display system in the closed orientation according to the example of FIG. 4A.
Figure 4E:
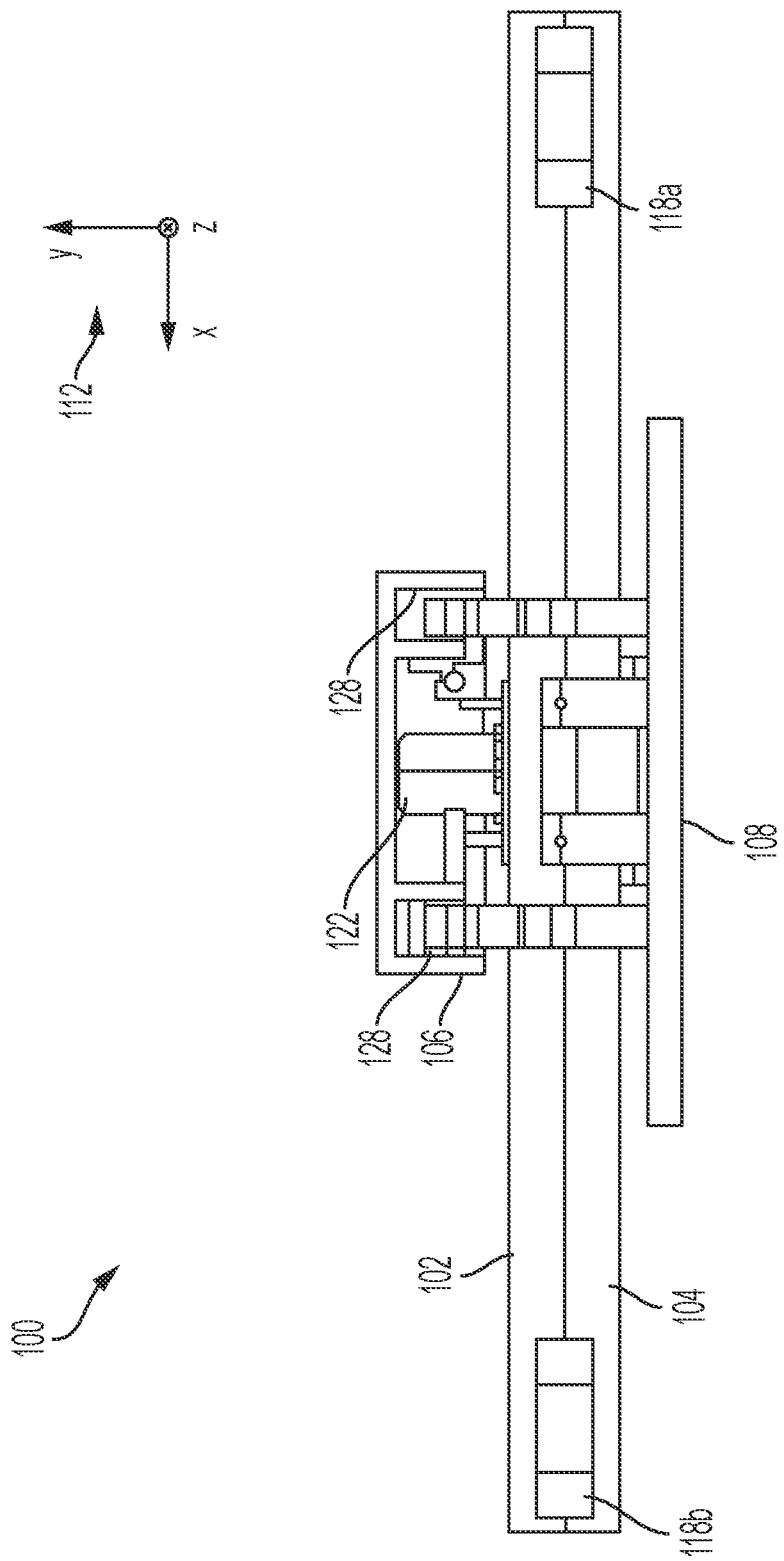
FIG. 4E illustrates a back view of the display system in the closed orientation according to the example of FIG. 4A.

FIG. 4A illustrates a front-perspective view of the display system 100 in a closed orientation according to an example. FIG. 4B illustrates a back-perspective view of the display system 100 in the closed orientation according to the example of FIG. 4A. FIG. 4C illustrates a right-side view of the display system 100 in the closed orientation according to the example of FIG. 4A. FIG. 4D illustrates a front view of the display system 100 in the closed orientation according to the example of FIG. 4A. FIG. 4E illustrates a back view of the display system 100 in the closed orientation according to the example of FIG. 4A.

In the closed orientation, the orientation angle 120 may be approximately 0°. The closed orientation may advantageously protect the displays 102, 104 from damage by not exposing the display screens 114, 116. Furthermore, the closed orientation may advantageously reduce a physical footprint of the display system 100, such that the display system 100 does not occupy a significant amount of space. A user may subsequently open the display system 100 from the closed orientation and resume using the display system 100, for example, in the minimally open orientation, partially open orientation, and/or fully open orientation. In various examples, the display system 100 may enter a low-power, sleep, or off-mode responsive to being placed in the closed orientation. For example, the displays 102, 104 may discontinue displaying information in the closed orientation.

Figure 5A:
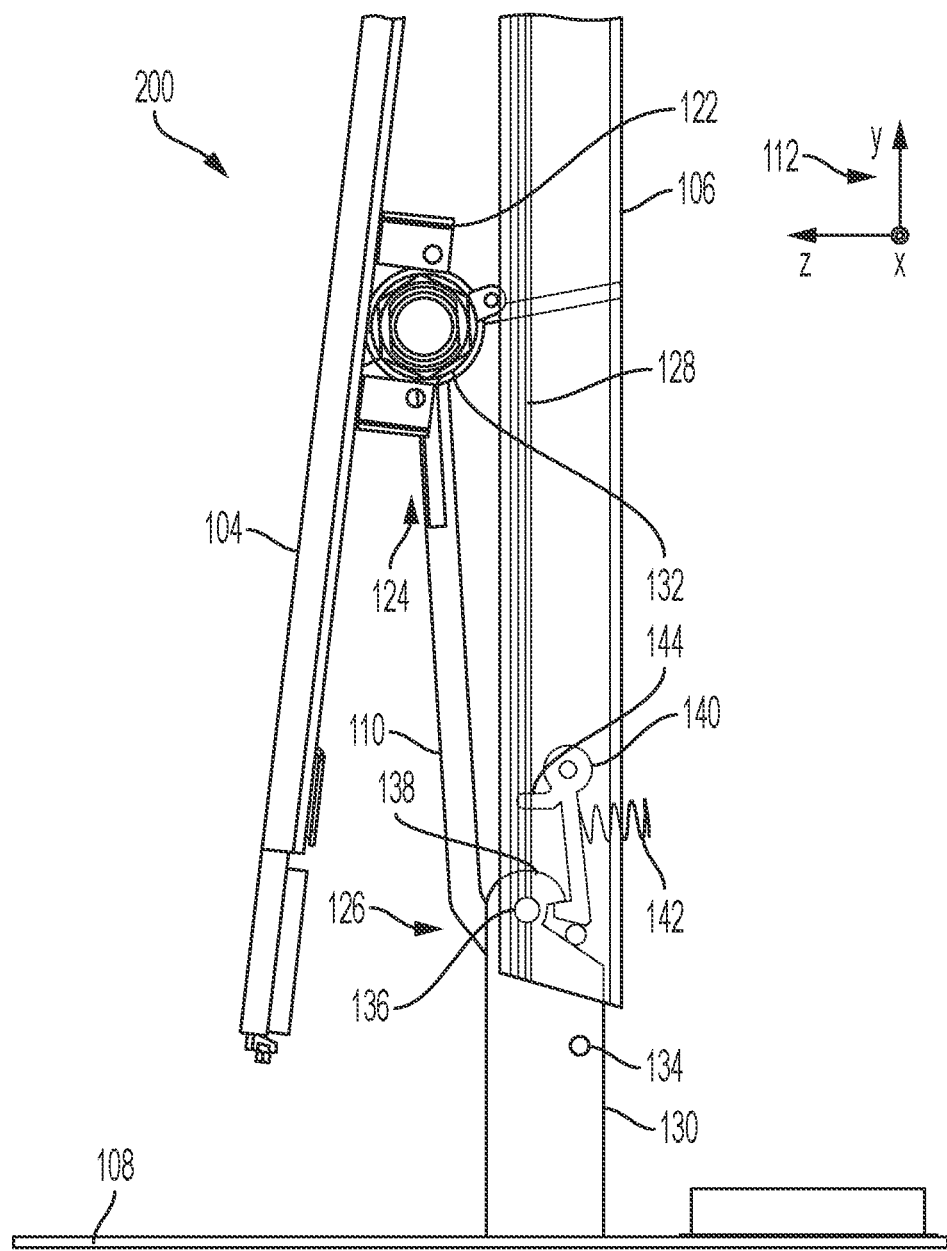
FIG. 5A illustrates a side partially cut-away view of a display system, which may be similar to the display system of FIGS. 1A-4E, in a partially open orientation according to an example.
Figure 5B:
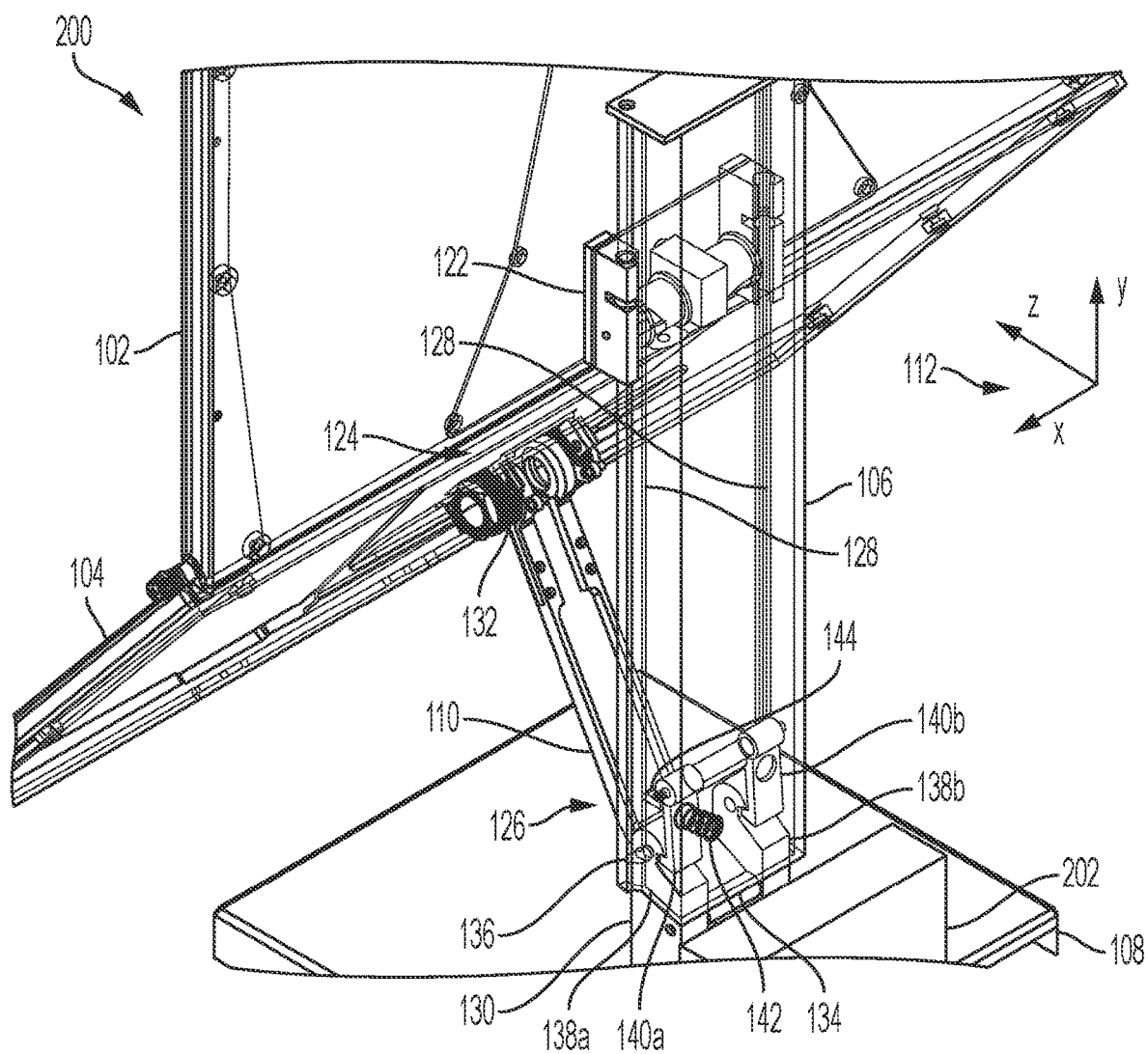
FIG. 5B illustrates a back-perspective partially cut-away view of the display system of FIG. 5A in the partially open orientation according to an example.

As discussed above, in some examples the support 106 may be rotated about the x-axis in part by activating a release bar. FIG. 5A illustrates a side partially cut-away view of a display system 200, which may be substantially similar to the display system 100, in the partially open orientation according to an example. FIG. 5B illustrates a back-perspective partially cut-away view of the display system 200, which may be similar to the display system 100, in the partially open orientation according to an example.

As illustrated in FIGS. 5A and 5B, the support 106 may be coupled to the base 108 via a protrusion 130. In some examples, the protrusion 130 is a component of the support 106. In another example, the protrusion 130 is a component of the base 108. In still other examples, the protrusion 130 is not a component of the support 106 or the base 108. The protrusion 130 facilitates rotation of at least the support 106 and the linkage bar 110. The linkage bar 110 includes at least one first hinge 132 rotatably coupled to a back surface of the second display 104 to enable rotation of the linkage bar 110 relative to the second display 104 about the x-axis. The linkage bar 110 further includes at least one second hinge 134 rotatably coupled to the protrusion 130 to enable rotation of the linkage bar 110 relative to the support 106 and/or the base 108 about the x-axis. The support 106 includes at least one third hinge 136 rotatably coupled to the protrusion 130 to enable rotation of the support pillar 106 relative to the base 108 about the x-axis.

In some examples, however, the support 106 may not rotate freely about the at least one third hinge 136. The protrusion 130 may limit or control rotation of the support 106 about the at least one third hinge 136. In one example, the protrusion 130 includes a first groove 138a and a second groove 138b (collectively, "grooves 138"). The support 106 includes a first lever 140a and a second lever 140b (collectively, "levers 140"). The first lever 140a is configured to mate with the first groove 138a, and the second lever 140b is configured to mate with the second groove 138b. The support 106 includes at least one coupling mechanism 142 configured to facilitate mating between at least one of the levers 140 and at least one of the grooves 138. For example, the at least one coupling mechanism 142 may include a spring exerting a restoring force along the z-axis to push the first lever 140a into the first groove 138a. In various examples, a similar coupling mechanism may exert a force along the z-axis on the second lever 140b, but is omitted from FIGS. 5A and 5B for clarity. In some examples, the levers 140a, 140b are fixedly coupled to one another, or each fixedly coupled to a bar, such that the levers 140a, 140b rotate together. In other examples, the levers 140a, 140b may not be fixedly coupled to one another, such that the levers 140a, 140b may rotate independently from one another.

A coupling between the grooves 138 and levers 140 may resist rotation of the support 106 about the x-axis via the at least one third hinge 136 unless the levers 140 are separated from the grooves 138. Accordingly, the grooves 138 and the levers 140 may collectively be referred to as a "catch mechanism." The support 106 further includes a release bar 144, also referred to herein as a "release mechanism," coupled to the levers 140. The release bar 144 is configured to release the catch mechanism when activated. The release bar 144 is activated by exerting a downwards force along the −y-axis on the release bar 144. Exerting the downwards force along the −y-axis on the release bar 144 induces a counterclockwise moment about the x-axis, thereby separating the levers 140 from the grooves 138. To exert the downwards force, the sliding coupler 122 may be slid down the tracks 128 along the −y-axis. The release bar 144 is aligned with the tracks 128 such that the sliding coupler 122 may exert a downwards force along the −y-axis onto the release bar 144 when the sliding coupler 122 contacts the release bar 144. In various examples, the support 106 may be capable of rotating only counterclockwise about the x-axis, at least because the grooves 138 and levers 140 prevent clockwise rotation about the x-axis regardless of whether the release bar 144 is activated.

As discussed above, the display system 100 may be communicatively and/or electrically coupled to a computing device. In some examples, the display system 100 may further be connected to one or more power sources, such as an AC-power utility mains, or the computing device itself. For example, the base 108 may include one or more wired or wireless communication and/or electrical interfaces, such as power ports, wired-communication ports, antennas, wireless-charging coils, and so forth, to enable communicative and/or electrical coupling between the display system 100 and at least one computing device and/or power source. In one example, the base 108 may include a first power interface to receive power from a power source (for example, an AC-power utility mains source), and a second power interface to provide power to the at least one computing device, such that the display system 100 may charge the at least one computing device. In another example, the base 108 may or may not be configured to receive power from a separate power source, and may include a power interface to receive power from the at least one computing device. In another example, the base 108 may receive power from a separate power source, and may not provide or receive any power from the at least one computing device.

The display system 100 may receive information from the at least one computing device, based upon which the displays 102, 104 may display information. In some examples, the display system 100 may also provide information to the at least one computing device. For example, at least one of the displays 102, 104 may include a touch-sensitive screen to receive touch inputs from a user. In another example, the display system 100 may include one or more user-interface elements, such as buttons, switches, knobs, sliders, touch-sensitive surfaces, and so forth, to receive user-input information, such as volume-control information. The display system 100 may include one or more wired and/or wireless communication interfaces to facilitate information exchange with the at least one computing device. For example, the base 108 may include a wired-communication port, such as a USB-A connection port, a USB-C connection port, a Micro-USB connection port, a Mini-USB connection port, or another type of wired-communication port. In another example, the display system 100 may include one or more wireless-communication interfaces, such as one or more antennas.

The display system 100 may include one or more computing elements to facilitate receiving, transmitting, and/or processing information. For example, the display system 100 may include one or more controllers configured to execute various operations, such as by controlling the displays 102, 104 to output information based on display information received from the at least one computing device. Using data stored in associated memory and/or storage, the controller also executes one or more instructions stored on one or more non-transitory computer-readable media that may result in manipulated data. In some examples, the controller may include one or more processors or other types of controllers. In another example, the controller performs at least a portion of the operations discussed above using an application-specific integrated circuit tailored to perform particular operations in addition to, or in lieu of, a general-purpose processor. As illustrated by these examples, examples in accordance with the present invention may perform the operations described herein using many specific combinations of hardware and software and the invention is not limited to any particular combination of hardware and software components.

In one example, at least a portion of the one or more computing elements may be housed in the base 108 and/or the support 106. In another example, the display system 100 may include one or more enclosures to at least partially enclose the one or more computing elements. For example, as illustrated in FIGS. 5A and 5B, the display system 200 may include an enclosure 202 in which one or more computing elements, such as one or more controllers, may be housed. In another example, the support 106 may include or be coupled to a partial enclosure configured to house or support the at least one computing device. For example, the support 106 may be coupled to a sleeve configured to hold the at least one computing device, which may include, for example, a laptop computer, desktop computer, tablet computer, and so forth. In one example, the sleeve may include one or more interfaces to facilitate at least one electrical and/or communicative connection between the display system 100, 200 and the at least one computing device. In various examples in which the sleeve is coupled to the support 106, the at least one computing device may be electrically and/or communicatively coupled to the display system 100, 200 when the at least one computing device is within the sleeve, and when the at least one computing device is not within the sleeve.

In at least one example, power and/or data may be distributed to one or more components of the display system 100, 200. For example, power and/or data may be transmitted from the base 108 and/or support 106 to the displays 102, 104. In one example, one or more media may be enclosed within the linkage bar 110 to distribute power and/or data from the base 108 and/or support 106 to the first display 102 and/or the second display 104. In one example, the one or more media include a first medium configured to distribute power and/or data to the first display 102, and a second, separate medium configured to distribute power and/or data to the second display 104.

In another example, one of the displays 102, 104 may receive power and/or data from the one or more media, and subsequently transmit power and/or data to the other of the displays 102, 104 in addition to, or in lieu of, the other of the displays 102, 104 receiving power and/or data directly from the one or more media. For example, the second display 104 may transmit at least a portion of the power and/or data to the first display 102 in at least one example. The display system 100, 200 may include one or more media communicatively and/or electrically coupling the first display 102 to the second display 104 (not illustrated). Furthermore, the second display 104 may transmit information (for example, user-input information received at at least one of the display screens 114, 116) to the base 108 and/or support 106 via the linkage bar 110, and/or to the first display 102.

In some examples, one or more media may be enclosed within the support 106 and/or sliding coupler 122 to distribute power and/or data from the base 108 and/or support 106 to the first display 102. The first display 102 may transmit at least a portion of the power and/or data to the second display 104 in at least one example. For example, the display system 100, 200 may include one or more media communicatively and/or electrically coupling the first display 102 to the second display 104 (not illustrated). Furthermore, the first display 102 may transmit information (for example, user-input information received by at least one of the display screens 114, 116) to the base 108 and/or support 106 via the sliding coupler 122, and/or to the second display 104.

As discussed above, the orientation angle 120 in the partially open orientation may range between approximately 90° or slightly greater at the minimally open orientation, and approximately 180° or slightly less at the fully open orientation. In other examples, other ranges of orientation angles may be implemented. In some examples, the orientation angle 120 may be less than 90° without any rotation of the support 106 about the x-axis. For example, the second display 104 may continue rotating about the x-axis via the hinges 118 to achieve an orientation angle less than 90° without rotation of the support 106. In at least one example, the display system 100 may be configured such that the displays 102, 104 are capable of being rotated such that the orientation angle 120 is 0° without rotating the support 106. For example, the second display 104 may be configured to rotate about the hinges 118 from a fully open orientation to a closed orientation (for example, by rotating approximately 180°) without rotation of the first display 102.

A length of the linkage bar 110 may be increased to achieve such orientation angles. In some examples, the length of the linkage bar 110 may be adjustable. For example, the linkage bar 110 may be a telescoping arm. In various examples, the linkage bar 110 may be omitted, and the displays 102, 104 may be rotatable about the hinges 118. The hinges 118 may include torque hinges to maintain a desired value of the orientation angle 120 in some examples, whereas in others, the hinges 118 may not include torque hinges. For example, in examples in which the linkage bar 110 is included, the linkage bar 110 may exert a force on the second display 104 that induces a clockwise moment on the second display 104 at the hinges 118 about the x-axis, which may counteract a counterclockwise moment on the second display 104 at the hinges 118 about the x-axis caused by a gravitational force.

In some examples, a linkage bar may be coupled to the first display 102 in addition to, or in lieu of, the linkage bar 110 being coupled to the second display 104. Furthermore, the second display 104 may include or be coupled to a sliding coupler to slidably couple to the support 106 in addition to, or in lieu of, the sliding coupler 122 being coupled to the tracks 128. In various examples, the first display 102 may rotate about the hinges 118. For example, the sliding coupler 122 may include one or more hinges configured to enable rotation about the x-axis, or may be replaced by a component that enables rotation about the x-axis, such as in an example in which the first display 102 is coupled to a linkage bar, where the second display 104 may or may not be coupled to a sliding coupler.

In various examples, one or more components of the display system 100 may be configured to rotate about the y-axis and/or z-axis. For example, the support 106 may be rotatably coupled to the base 108 about the y-axis, such as by including or being coupled to a rotatable plane (for example, a circular rotating plate) configured to rotate about the y-axis. In another example, the support 106 may include, or be coupled to, a rotatable component that enables rotation of the displays 102, 104 about the z-axis. For example, the support 106 may not be directly coupled to the base 108, and may instead be coupled to a fixed support that is directly coupled (for example, fixedly or rotatably) to the base 108. The support 106 may be rotatably coupled to the fixed support, such as by being rotatably coupled to a rotatable plane configured to enable rotation of the support 106 (and, consequently, the displays 102, 104) about the z-axis.

In some examples, the support 106 may be rotatable about the x-axis via the at least one third hinge 136. As discussed above, the support 106 may only be rotatable when the release bar 144 is activated. In other examples, the support 106 may be freely rotatable about the x-axis regardless of whether a release mechanism is implemented or activated. In some examples, the at least one third hinge 136 may include torque hinges to resist a moment applied by gravity. Although in some examples rotation of the support 106 about the x-axis (for example, clockwise about the x-axis) may be limited at least in part by the grooves 138 and levers 140, in other examples, the grooves 138 and levers 140 may be omitted or modified such that the support 106 is not, or is less, limited in rotation about the x-axis.

As discussed above, information may be displayed by the displays 102, 104. In some examples, the information displayed by the displays 102, 104 may be identical or different. For example, the displays 102, 104 may display contiguous portions of a displayed web page or document as though the displays 102, 104 were a single display. In various examples, users may be able to configure what information the displays 102, 104 display, and how.

Although in some examples display systems of the disclosure may include two displays, in other examples, the display system may include a plurality of displays having greater than two displays. The plurality of displays may be the same or different in orientation, size, and/or other parameters. Each display may be positioned above, below, and/or to the sides of the other displays.

In some examples, a display system may include a single display. For example, the single display may include a foldable display having at least two sections separated by an articulable fold line such that, rather than a hinged interface implemented in connection with the discrete articulable hinges between the displays 102, 104 (for example, pin-based hinges), a single display may be implemented having a fold line to serve a similar function. The foldable display may be considered an articulable display inasmuch as the fold line provides an interface about which different sections of the foldable display may rotate relative to one another.

Figure 6:
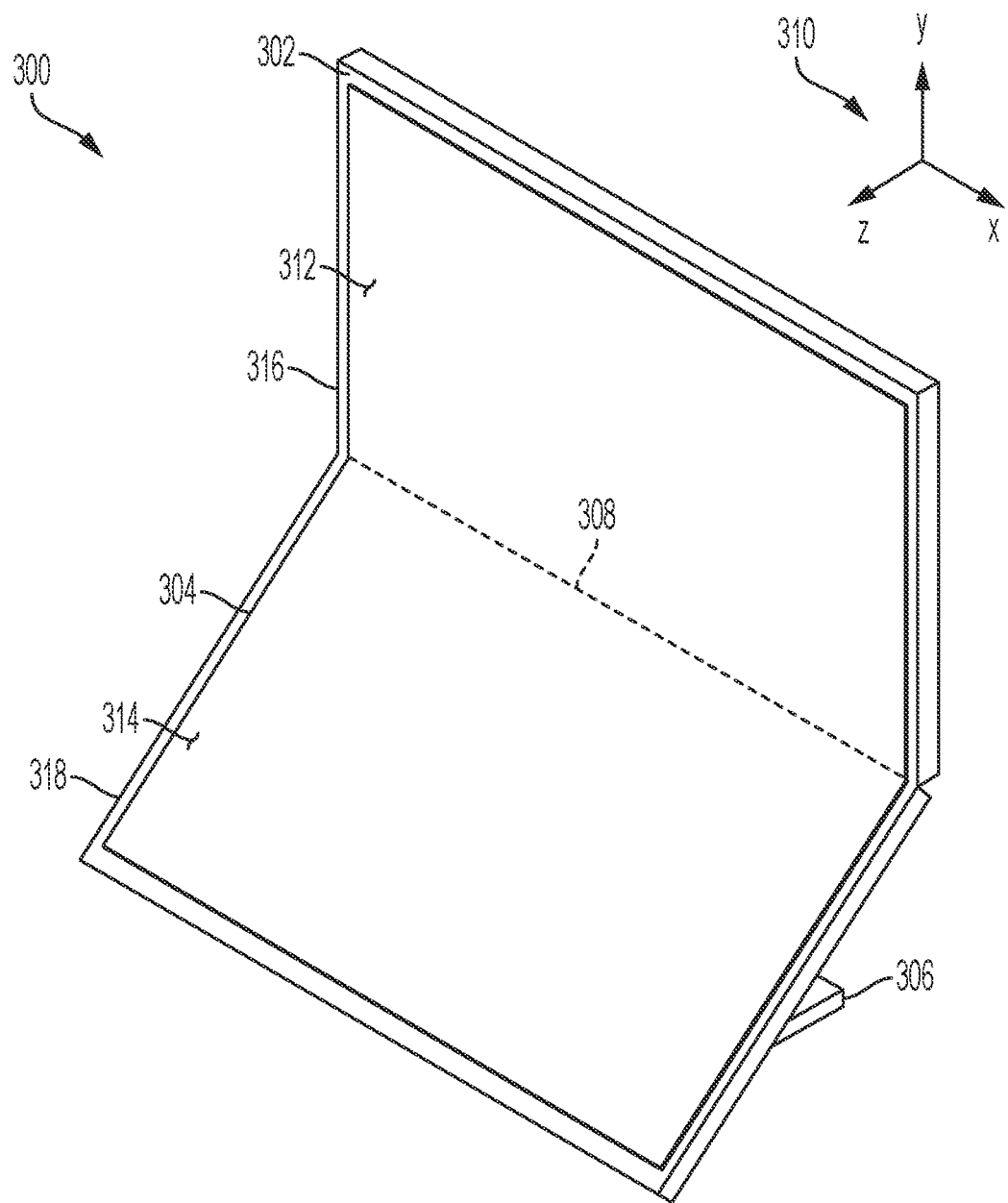
FIG. 6 illustrates a front-perspective view of a display system in a partially open orientation according to an example.

FIG. 6 illustrates a front-perspective view of a display system 300 in a partially open orientation according to an example. The display system 300 is substantially similar to the display system 100. However, whereas the display system 100 includes a first display 102 and a second display 104, the display system 300 includes a foldable display 302 having a foldable display screen 304. The foldable display 302 is supported at least in part by a base 306, which may be substantially similar or identical to the base 108. The foldable display 302 may include and/or be coupled to additional stand components which are not visible in FIG. 6 and which are substantially similar or identical to the support 106, the linkage bar 110, and so forth, discussed above.

The foldable display 302 is foldable about a fold line 308 such that the foldable display 302 is rotatable about the x-axis indicated by a legend 310. Folding the foldable display 302 about the fold line 308 may visually partition the foldable display screen 304 into a first display-screen section 312 above the fold line 308 and a second display-screen section 314 below the fold line 308.

Accordingly, the foldable display 302 may include a first display portion 316 and a second display portion 318 separated by the fold line 308. The first display portion 316 may perform a substantially similar function as the first display 102. The second display portion 318 may perform a substantially similar function as the second display 104. For example, the first display portion 316 may be slidably coupled to a support in a similar manner as the first display 102 being slidably coupled to the support 106 via the sliding coupler 122. The second display portion 318 may be rotatably coupled to the first display portion 316 and the support 306 in a similar manner as the second display 104 being rotatably coupled to the first display 102 and the support 108 via the hinges 118 and the linkage bar 110.

The first display-screen section 312 and the second display-screen section 314 may therefore provide a similar user experience as the first display screen 114 and the second display screen 116. However, the display-screen sections 312, 314 may not be discrete display screens in some examples, and are instead visually segmented sections of a single continuous screen. It is to be appreciated that although the display-screen sections 312, 314 may not be considered discrete display screens from a visual perspective in some examples, the display portions 316, 318 may perform discrete functions or exhibit discrete relationships with other aspects of the display system 300, such as the first display portion 316 being slidably coupled to a support, and the second display portion 318 being rotatably coupled to the base 306.

The foldable display 302 may therefore provide an increased density of information to a user. The area about the fold line 308 is part of the single continuous screen and can display information at the interface between the display-screen sections 312, 314. Conversely, information may not be displayed at an interface of the displays 102, 104 at least because the hinges 118 and portions of the housing of the displays 102, 104, rather than the display screens 114, 116, occupy the interface between the displays 102, 104. Other components of the display system 300 which have not been specifically identified may be substantially similar or identical to the components of the display system 100 and/or 200, and are not repeated for purposes of brevity.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A display system comprising:
    a support;
    a first display slidably coupled to the support, wherein the first display is configured to display output information received from at least one computing device;
    a sliding coupler coupled to the first display and slidably coupled to the support;
    a base coupled to the support via a protrusion, wherein the support is rotatably coupled to the protrusion;
    a catch mechanism configured to prevent rotation of the support about the base;
    a release mechanism configured to release the catch mechanism, wherein the sliding coupler is configured to exert a force on the release mechanism to release the catch mechanism, and wherein releasing the catch mechanism enables rotation of the support about the base; and
    a second display rotatably coupled to the first display and rotatably coupled to the support, wherein the second display is configured to display output information received from the at least one computing device, and wherein the second display is configured to rotate about the first display responsive to the first display being slid along the support.

2. The display system of claim 1, further comprising a linkage bar coupled to the second display.

3. The display system of claim 2, wherein the linkage bar is rotatably coupled to the second display.

4. The display system of claim 3, further comprising a base coupled to the support via a protrusion, wherein the linkage bar is rotatably coupled to the protrusion.

5. The display system of claim 1, wherein the support is configured to rotate approximately 90° about the base.

6. The display system of claim 5, wherein the sliding coupler is configured to slide between a highest position on the support and a lowest position on the support, and wherein an angle between the first display and the second display at the highest position is approximately 180°.

7. The display system of claim 6, wherein the angle between the first display and the second display at the lowest position is approximately 90°.

8. The display system of claim 7, wherein subsequent to rotating the support approximately 90° about the base, the angle between the first display and the second display is approximately 0°.

9. A method of facilitating use of a display system, the method comprising:
    providing a display system including:
        a support;
        a first display slidably coupled to the support, wherein the first display is configured to display output information received from at least one computing device;
        a sliding coupler coupled to the first display and slidably coupled to the support;
        a base coupled to the support via a protrusion, wherein the support is rotatably coupled to the protrusion;
        a catch mechanism configured to prevent rotation of the support about the base;
        a release mechanism configured to release the catch mechanism, wherein the sliding coupler is configured to exert a force on the release mechanism to release the catch mechanism, and wherein releasing the catch mechanism enables rotation of the support about the base; and
        a second display rotatably coupled to the first display and rotatably coupled to the support, wherein the second display is configured to display output information received from the at least one computing device;
    instructing a user of the display system to couple the display system to the at least one computing device; and
    instructing the user of the display system to slide the first display along the support, and wherein the second display is configured to rotate about the first display responsive to the first display being slid along the support.

10. The method of claim 9, further comprising instructing the user of the display system to rotate the second display about the first display.

11. The method of claim 9, wherein the method further comprises instructing the user to rotate the support about the base.

12. The method of claim 11, wherein instructing the user to rotate the support about the base includes instructing the user to slide the first display to a lowest position on the support.

13. The method of claim 11, wherein instructing the user to rotate the support about the base includes instructing the user to rotate the support approximately 90° to a closed orientation.

* * * * *